(12) United States Patent
Cain

(10) Patent No.: US 11,693,573 B2
(45) Date of Patent: Jul. 4, 2023

(54) RELAYING STORAGE OPERATION REQUESTS TO STORAGE SYSTEMS USING UNDERLYING VOLUME IDENTIFIERS

(71) Applicant: HEWLETT PACKARD ENTERPRISE DEVELOPMENT LP, Houston, TX (US)

(72) Inventor: Bradley Cain, Westborough, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 42 days.

(21) Appl. No.: 16/905,122

(22) Filed: Jun. 18, 2020

(65) Prior Publication Data
US 2021/0397356 A1    Dec. 23, 2021

(51) Int. Cl.
*G06F 11/00* (2006.01)
*G06F 3/06* (2006.01)
*G06F 11/14* (2006.01)

(52) U.S. Cl.
CPC .......... *G06F 3/0644* (2013.01); *G06F 3/0604* (2013.01); *G06F 3/0673* (2013.01); *G06F 11/1471* (2013.01); *G06F 2201/82* (2013.01)

(58) Field of Classification Search
CPC .... G06F 3/0644; G06F 3/0604; G06F 3/0673; G06F 11/1471; G06F 2201/82
See application file for complete search history.

(56) References Cited

U.S. PATENT DOCUMENTS

| 7,587,570 | B2 | 9/2009 | Sarkar et al. |
| 7,930,476 | B1 | 4/2011 | Castelli et al. |
| 8,386,610 | B2 | 2/2013 | Yahalom et al. |
| 8,478,799 | B2 | 7/2013 | Beaverso et al. |
| 8,621,461 | B1 | 12/2013 | Chandrachari et al. |
| 9,015,713 | B2 | 4/2015 | Baset et al. |
| 9,021,476 | B1 | 4/2015 | Pratt |
| 9,135,046 | B1 | 9/2015 | Pratt |
| 9,372,758 | B2 | 6/2016 | Ashutosh et al. |
| 9,418,015 | B2 | 8/2016 | Sundaram et al. |
| 9,432,350 | B2 | 8/2016 | Anderson et al. |
| 9,436,391 | B1 | 9/2016 | Lewis et al. |
| 9,590,879 | B2 | 3/2017 | Wray |
| 9,667,725 | B1 | 5/2017 | Khanduja et al. |

(Continued)

OTHER PUBLICATIONS

Red Hat, Inc. "Dynamic Provisioning and Creating Storage Classes", Jul. 16, 2019, 12 pages, retrieved from internet: https://web.archive.org/web/20190716081123/https://docs.openshift.com/containerplatform/3.4/install_config/persistent_storage/dynamically_provisioning_pvs.html.

(Continued)

*Primary Examiner* — Philip Guyton
(74) *Attorney, Agent, or Firm* — Hewlett Packard Enterprise Patent Department

(57) ABSTRACT

Example implementations relate to virtual persistent volumes. In an example, a storage operation request includes a volume identifier. A volume mapping that corresponds to the volume identifier is identified. Underlying volume identifiers are identified based on the volume mapping. The underlying volume identifiers relate to underlying storage volumes that form at least part of a virtual persistent volume associated with the volume identifier. The storage operation request is relayed, using the underlying volume identifiers, to storage systems on which the underlying storage volumes are respectively located.

17 Claims, 8 Drawing Sheets

(56) References Cited

U.S. PATENT DOCUMENTS

| | | |
|---|---|---|
| 9,705,730 B1 | 7/2017 | Petri et al. |
| 9,798,474 B2 | 10/2017 | Barzik et al. |
| 9,800,575 B1 | 10/2017 | Lewis et al. |
| 10,013,196 B2 | 7/2018 | Tylik et al. |
| 10,055,420 B1 | 8/2018 | Pogde et al. |
| 10,127,234 B1 | 11/2018 | Krishnan et al. |
| 10,140,139 B1 | 11/2018 | Pratt |
| 10,146,580 B2 | 12/2018 | Chen |
| 10,216,455 B1 | 2/2019 | Schroeder et al. |
| 10,223,024 B2 | 3/2019 | Sharma |
| 10,241,709 B2 | 3/2019 | Scales et al. |
| 10,326,744 B1 | 6/2019 | Nossik et al. |
| 10,397,236 B1 | 8/2019 | Chadha et al. |
| 10,432,483 B1 | 10/2019 | Thompson |
| 10,452,298 B2 | 10/2019 | Kurjanowicz et al. |
| 10,500,441 B2 | 12/2019 | Lagree |
| 2002/0120741 A1 | 8/2002 | Webb et al. |
| 2002/0152305 A1 | 10/2002 | Jackson et al. |
| 2004/0120225 A1 | 6/2004 | Dalal et al. |
| 2004/0123029 A1 | 6/2004 | Dalal et al. |
| 2004/0123030 A1 | 6/2004 | Dalal et al. |
| 2004/0123062 A1 | 6/2004 | Dalal et al. |
| 2004/0123063 A1 | 6/2004 | Dalal et al. |
| 2005/0060722 A1 | 3/2005 | Rochette et al. |
| 2005/0283567 A1 | 12/2005 | Popescu-Stanesti et al. |
| 2007/0044004 A1 | 2/2007 | Hino et al. |
| 2007/0283091 A1 | 12/2007 | Nagae et al. |
| 2007/0283119 A1 | 12/2007 | Sarkar et al. |
| 2009/0172666 A1 | 7/2009 | Yahalom et al. |
| 2009/0182928 A1 | 7/2009 | Becker et al. |
| 2009/0183173 A1 | 7/2009 | Becker et al. |
| 2009/0249018 A1 | 10/2009 | Nojima et al. |
| 2010/0077160 A1 | 3/2010 | Liu et al. |
| 2011/0060878 A1 | 3/2011 | Kaneko et al. |
| 2011/0124409 A1 | 5/2011 | Baynes et al. |
| 2012/0017046 A1 | 1/2012 | Mehta et al. |
| 2012/0089980 A1 | 4/2012 | Sharp et al. |
| 2012/0117029 A1 | 5/2012 | Gold |
| 2012/0311292 A1 | 12/2012 | Maniwa et al. |
| 2012/0317355 A1 | 12/2012 | Ishizaki et al. |
| 2013/0042083 A1 | 2/2013 | Mutalik et al. |
| 2013/0054932 A1 | 2/2013 | Acharya et al. |
| 2013/0297871 A1 | 11/2013 | Reddy |
| 2014/0006740 A1 | 1/2014 | Tokusho et al. |
| 2014/0130055 A1 | 5/2014 | Guha |
| 2014/0156877 A1 | 6/2014 | Tylik et al. |
| 2014/0173675 A1 | 6/2014 | Ahmed et al. |
| 2014/0245016 A1 | 8/2014 | Desai et al. |
| 2015/0217164 A1 | 8/2015 | Lagree |
| 2016/0041787 A1 | 2/2016 | Nicolae |
| 2016/0070652 A1 | 3/2016 | Sundararaman et al. |
| 2016/0188421 A1 | 6/2016 | Karinta et al. |
| 2016/0196217 A1 | 7/2016 | Chiu et al. |
| 2016/0291892 A1 | 10/2016 | Rao et al. |
| 2016/0357450 A1 | 12/2016 | Rao et al. |
| 2017/0013046 A1 | 1/2017 | Flynn |
| 2017/0083250 A1 | 3/2017 | Beeken et al. |
| 2017/0087470 A1 | 3/2017 | Bostick et al. |
| 2017/0116273 A1 | 4/2017 | Liu et al. |
| 2017/0139782 A1 | 5/2017 | Chen |
| 2017/0177224 A1 | 6/2017 | Glover et al. |
| 2017/0279797 A1 | 9/2017 | Cross et al. |
| 2017/0315795 A1 | 11/2017 | Keller |
| 2018/0083845 A1 | 3/2018 | Chan et al. |
| 2018/0181756 A1 | 6/2018 | Campagna et al. |
| 2018/0239559 A1 | 8/2018 | Venetsanopoulos et al. |
| 2018/0276689 A1 | 9/2018 | Zhang et al. |
| 2018/0300325 A1 | 10/2018 | Chircop |
| 2018/0343019 A1 | 11/2018 | Xiang et al. |
| 2019/0050257 A1 | 2/2019 | Srinivasan |
| 2019/0065323 A1 | 2/2019 | Dhamdhere et al. |
| 2019/0102265 A1 | 4/2019 | Ngo et al. |
| 2019/0114102 A1 | 4/2019 | Chen |
| 2019/0158541 A1 | 5/2019 | Miriyala et al. |
| 2019/0212998 A1* | 7/2019 | Vallala ..................... G06F 8/71 |
| 2019/0235761 A1 | 8/2019 | Watkins et al. |
| 2019/0236316 A1 | 8/2019 | Watkins et al. |
| 2019/0266100 A1 | 8/2019 | Mello et al. |
| 2020/0042214 A1 | 2/2020 | Chen et al. |
| 2020/0241909 A1 | 7/2020 | Govindaraju et al. |
| 2020/0241999 A1 | 7/2020 | Guim et al. |
| 2020/0310849 A1 | 10/2020 | Laurence et al. |
| 2020/0311299 A1 | 10/2020 | Amar |
| 2020/0322453 A1 | 10/2020 | Said et al. |
| 2020/0379880 A1 | 12/2020 | Rodrigues Rosa Junior |
| 2021/0008413 A1 | 1/2021 | Asikainen et al. |
| 2021/0109683 A1 | 4/2021 | Bradley |
| 2021/0109772 A1 | 4/2021 | Jaloma et al. |
| 2021/0124614 A1 | 4/2021 | Gupta et al. |
| 2021/0133338 A1 | 5/2021 | Chopra et al. |
| 2021/0173815 A1 | 6/2021 | Kazi et al. |
| 2021/0397356 A1* | 12/2021 | Cain ..................... G06F 3/0631 |

OTHER PUBLICATIONS

HPE, "GUI Administration Guide", Version 5.1.x, Nov. 2, 2020, 306 pages.

Kubernetes, "Horizontal Pod Autoscaler", available online at <https://web.archive.org/web/20191217234051/https://kubernetes.io/docs/tasks/run-application/horizontal-pod-autoscale/>, Dec. 17, 2019, 9 pages.

Martinsen, Rudi, "Limiting disk i/o in vSphere", available online at <https://rudimartinsen.com/2018/06/18/limiting-disk-i-o-in-vsphere/>, Jun. 18, 2018, 7 pages.

VMware, "vSphere Resource Management", Update 1, 2017, 146 pages.

Red Hat, What is container orchestrations?, Dec. 2, 2019 [retrieved from internet Jan. 17, 2022][<URL:https://www.redhat.com/en/topics/containers/what-is-container-orchestration>], 9 pages.

The Linux Information Project, "The /mnt Directory," Feb. 13, 2006, <http://www.linfo.org/mnt.html>, 1 page.

Ali et al., "Performance Analysis Framework to Optimize Storage Infrastructure for Cloud Computing," Aug. 30, 2012, 6 pages.

Aluciani, "Nutanix Releases New Kubernetes CSI-Based Driver," available online at >https://next.nutanix.com/blog-40/nutanix-releases-new-kubernetes-csi-based-driver-30941>, Nutanix, Inc., Sep. 26, 2018, 8 pages.

Anoop Vijayan Maniankara, "Understanding the Container Storage Interface (CSI)", available online at >https://medium.com/google-cloud/understanding-the-container-storage-interface-csi-ddbeb966a3b>, Aug. 13, 2018, pp. 1-8.

DataCore Software, "Container Persistent Storage", available online at <https://www.datacore.com/products/software-defined-storage/container-storage/>, 2019, 9 pages.

Dejan Živanovic, "EMC: The Virtual Data Center", 2008, pp. 1-24.

Dell EMC, "Dell EMC Isilon ONEFS: A Technical Overview", Nov. 2017, pp. 1-37.

Dell Inc., "Dell MD Storage Array VMware vStorage APIs for Storage Awareness (VASA) Provider (Client): User's Guide", 2015, pp. 1-21.

Edward L. Haletky, "Virtual storage appliance market: Categories, capabilities", available online at >https://searchstorage.techtarget.com/tip/Virtual-storage-appliance-market-Categories-capabilities>, Retrieved on Jun. 27, 2019, 3 pages.

EMC Corporation, "EMC Announces EMC Invista Network Storage Virtualization Platform", available online at >https://corporate.delltechnologies.com/en-us/newsroom/announcements/2005/05/20050516-3130.htm>, May 16, 2005, 5 pages.

EMC Corporation, "EMC® Rainfinity® File Management Appliance/VE Version 7.3: Getting Started Guide", Dec. 2009, pp. 1-78.

EMC Corporation, "EMC® Rainfinity® Global File Virtualization™ Application Version 7.2: Installation and User Guide", Jan. 2008, pp. 1-232.

EMC Corporation, "EMC® Rainfinity® Global Namespace Appliance Version 1.2.1: Getting Started Guide", Dec. 2008, pp. 1-132.

EMC Invista on Brocade, "Network-Based Storage Virtualization with EMC Invista and the Brocade Application Platform", Sep. 2007, 3 pages.

(56) References Cited

OTHER PUBLICATIONS

EMC2, "A Guide to Virtualizing Your Information Infrastructure", Oct. 2007, 12 pages.
EMC2, "EMC Rainfinity Global File Virtualization: Transparent Data Mobility for Heterogeneous File Storage", Oct. 2008, 2 pages.
F5 Networks, Inc., "Intelligent File Virtualization with F5 ARX", F5 White Paper, 2009, 11 pages.
F5 Networks, Inc., "Simplify Data Management and Reduce Storage Costs with File Virtualization", ARX Series, 2013, pp. 1-9.
Hitachi Vantara Knowledge, "Storage Plug-in for Containers Quick Reference Guide v2.0.1", available online at >https://knowledge.hitachivantara.com/Documents/Adapters_and_Drivers/Storage_Adapters_and_Drivers/Containers/2.0.1/01_Storage_Plug-in_for_Containers_Quick_Reference_Guide_v1.0.0>, Mar. 20, 2019, 45 pages.
Incipient, Inc., "Incipient NSP Addresses SAN Management Challenges by Reducing Complexity", 2006, 3 pages.
Janakiram MSV, "Managing Persistence for Docker Containers", available online at <https://thenewstack.io/methods-dealing-container-storage/>, Sep. 23, 2016, 20 pages.
Jay Vyas, "Kubernetes Storage: Dynamic Volumes and the Container Storage Interface",TheNewStack, available online at <https://thenewstack.io/kubernetes-storage-dynamic-volumes-and-the-container-storage-interface/>, May 7, 2019, 17 pages.
Kirill Goltsman, "Software-Defined Storage Solutions for Kubernetes", available online at <https://supergiant.io/blog/software-defined-storage-solutions-for-kubernetes/>, Feb. 8, 2019, 10 pages.
Kubernetes, "Introducing Container Storage Interface (CSI) Alpha for Kubernetes", available online at >https://kubernetes.io/blog/2018/01/introducing-container-storage-interface/>, Jan. 10, 2018, pp. 1-10.
Kubernetes, "Local Persistent Volumes for Kubernetes Goes Beta", available online at <https://kubernetes.io/blog/2018/04/13/local-persistent-volumes-beta/>, Apr. 13, 2018, 7 pages.
Michael Yakobi, "Understanding Kubernetes Persistent Volume Provisioning", NetApp, available online at >https://cloud.netapp.com/blog/understanding-kubernetes-persistent-volume-provisioning>, Nov. 20, 2018, 3 pages.
NETAPP, "Using NetApp with Docker and Kubernetes", SL10236 Version 1.0.2, May 2018, pp. 1-58.
Piotr Mrowczynski, "Scaling cloud-native Apache Spark on Kubernetes for workloads in external storages", Sep. 21, 2018, 63 pages.
Pirus Networks, "Pirus Networks offers new utility switch", available online at <https://www.computerweekly.com/news/2240044579/Pirus-Networks-offers-new-utility-switch>, Mar. 11, 2002, pp. 1-3.
Pirus Networks, "Pirus Product Overview", available online on <http://web.archive.org/web/20011031022514/http://www.pirus.com/products.html>, Oct. 31, 2001, pp. 1-2.
Red Hat OpenShift, "Persistent Storage", available online at <https://docs.openshift.com/online/architecture/additional_concepts/storage.html>, Retrieved online on Jun. 28, 2019, 9 pages.
Sun Microsystems, "Storage White Paper: Intelligent Storage Platform", available online at <http://web.archive.org/web/20030201194118/http://www.sun.com/storage/white-papers/intelligent_storage_platform.html>, Feb. 1, 2003, pp. 1-5.
Tech Target, "Application-aware Storage Promises Intelligence and Automation," available online at <https://web.archive.org/web/20160817083831/https://searchstorage.techtarget.com/feature/Application-aware-storage-promises-intelligence-and-automation>, Aug. 17, 2016, 5 pages.
Tushar Thole, "Part 1: Storage Policy Based Management for Containers Orchestrated by Kubernetes", vmware, available online at <https://blogs.vmware.com/virtualblocks/2017/04/17/storage-policy-based-management-containers-orchestrated-kubernetes/>, Apr. 17, 2017, 4 pages.
VMware, Inc., "APIs for Storage Awareness (VASA) Package", available online at <https://code.vmware.com/web/dp/other-programs/storage/vasa>, retrieved in 2020, 4 pages.
VMware, Inc., "vSphere Storage", Jun. 27, 2019, pp. 1-319.
Wikipedia, "OneFS distributed file system", Aug. 29, 2019, pp. 1-5.
Schenker, Gabriel N et al., "Getting started with containerization: reduce the operational burden on your system by automating and managing your containers", 2019, 3 pages.

* cited by examiner

RELAYING STORAGE OPERATION REQUESTS TO STORAGE SYSTEMS USING UNDERLYING VOLUME IDENTIFIERS

BACKGROUND

Containers are a type of virtualization. A container may include an application packaged together with dependencies and libraries. A containerized application may use or generate persistent data.

BRIEF DESCRIPTION OF THE DRAWINGS

Various examples will be described below with reference to the following figures.

DETAILED DESCRIPTION

Figure 1:
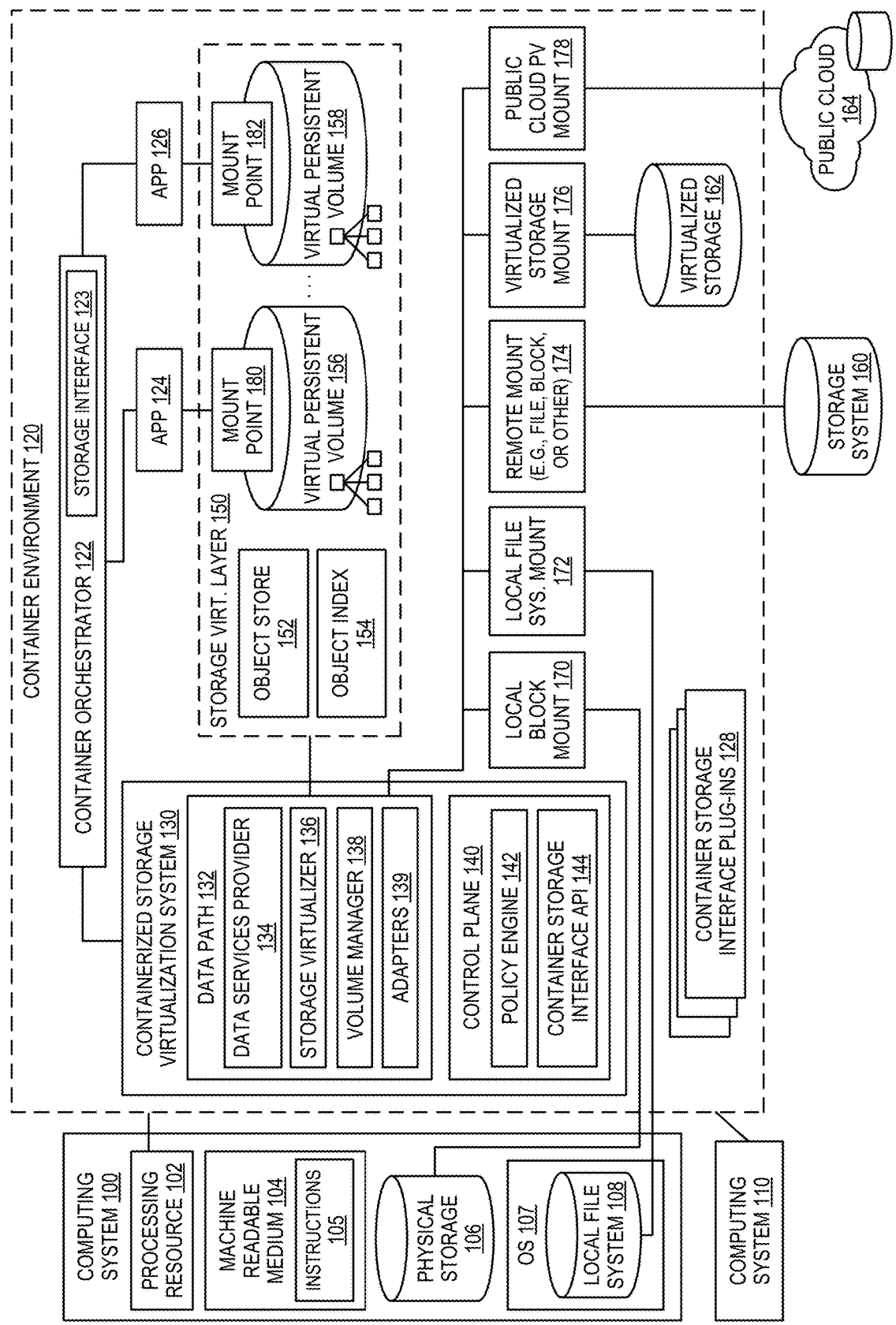
FIG. 1 depicts an example system that creates a virtual persistent volume that aggregates a plurality of different underlying storage and is presented to a containerized application.

Container technology is a computing virtualization paradigm where an application is packaged together with dependencies and libraries in a container to provide an isolated environment for running the application. Such an application may be referred to as a containerized application. Many containers can run on top of a single operating system, but each container is inherently isolated from other containers. In this manner, the container paradigm may be understood to virtualize the operating system. Containers may be more lightweight than other forms of virtualization such as virtual machines, which virtualize hardware. For example, each virtual machine may have its own copy of an operating system kernel, while by contrast, multiple containers may share an operating system kernel.

Containerized applications may need storage to retain persistent data. Container orchestrators (such as Kubernetes) may provide the capability of provisioning some storage for a container. However, many types of storage exist, including but not limited to storage that is local to the container, remote to the container, hardware (e.g., locally attached drive), software-defined (e.g., a file system, virtualized or containerized storage, storage presented via an API, etc.), or storage having a combination of the foregoing aspects. Prior efforts at provisioning container storage may fail to provide the levels of storage configuration flexibility and data services that users and administrators of container environments desire. For example, a container orchestrator may be limited to provisioning one type of storage for an application. Other types of systems may attempt to concatenate multiple volumes together into a single volume, but such concatenation may not have the flexibility to provide certain data services without disrupting user access to the data.

To address challenges and provide flexible and robust container-accessible persistent storage, examples described herein relate to a storage virtualization system and a policy engine thereof that can create a virtual persistent volume that aggregates a plurality of different underlying storage volumes that may be provisioned from different types of storage systems. The virtual persistent volume may take the form of a hierarchical structure, such as a Merkle tree, that relates data objects of the containerized application by their content-based signatures up to a root object.

Additionally, users or administrators may wish to perform various storage operations, such as snapshot, backup, or restore operations, on the aforementioned virtual persistent volume. Accordingly, further examples described herein relate to the storage virtualization system and the policy engine thereof mapping the storage operation on the virtual persistent volume to storage operations on the constituent underlying storage volumes of the virtual persistent volume. In particular, an example storage virtualization system may receive a storage operation request that includes a volume identifier associated with a virtual persistent volume. The storage virtualization system may then identify a storage mapping that corresponds to the volume identifier. The storage mapping includes an underlying volume identifier for each underlying storage volume that makes up the virtual persistent volume. The storage virtualization system may then relay the storage operation request to each storage system providing an underlying storage volume using the underlying volume identifier for that underlying storage volume. Thus, the storage virtualization system may act as a "fan-out" control point to manage the underlying storage volumes. Moreover, administration and management of storage of complex applications that utilize multiple storage types may be simplified and automated.

Referring now to the figures, FIG. 1 depicts an example computing system 100 that supports and participates in a container environment 120. The computing system 100 includes a processing resource 102 that may include a microcontroller, a microprocessor, central processing unit core(s), an application-specific integrated circuit (ASIC), a field programmable gate array (FPGA), etc. The computing system 100 includes a machine readable medium 104 that may be non-transitory and include random access memory (RAM), read-only memory (ROM), electrically erasable programmable read-only memory (EEPROM), flash memory, a hard disk drive, etc.

The processing resource 102 may execute instructions 105 (i.e., programming or software code) stored on machine readable medium 104 to perform functions of the computing system 100, such as providing a container orchestrator 122 and a containerized storage system 130, as will be described further below. More particularly, each of the components of the containerized storage virtualization system 130 may be implemented as executable instructions 105, including the data services provider 134, storage virtualizer 136, volume manager 138, adapters 139, policy engine 142, and container storage interface API 144. Containerized applications 124, 126 and container storage interface plug-ins 128 also may be implemented as instructions included in executable instructions 105. Additionally or alternatively, the processing resource 102 may include electronic circuitry for performing the functionality described herein.

The computing system 100 may also include other hardware components, such as physical storage 106. Physical storage 106 may include any physical storage device, such as a hard disk drive, a solid state drive, or the like, or a plurality of such storage devices (e.g., an array of disks), and may be locally attached (i.e., installed) in the computing system 100. In some implementations, physical storage 106 may be accessed as a block storage device.

In some cases, the computing system 100 may also include a local file system 108, which may be implemented as a layer on top of the physical storage 106. For example, an operating system 107 may be executing on the computing system 100 (by virtue of the processing resource 102 executing certain instructions 105 related to the operating system) and the operating system 107 may provide a file system 108 to store data on the physical storage 106.

The computing system 100 may be in communication with other computing systems, such as computing system 110, via a wired and/or wireless network for example. The other computing systems may be similar to the computing system 100, and may each include at least a processing resource and a machine readable medium. The computing systems 100 and 110 may each execute software (i.e., processing resource 102 executes certain instructions 105) to deploy nodes of a container orchestrator 122. In other words, the container orchestrator 122 may have a cluster architecture that includes the container orchestrator nodes of computing systems joined in a cluster. The container orchestrator 122 acts as a platform for deploying and managing containerized applications across the cluster of computing systems. The container orchestrator 122, containerized applications deployed therefrom, and other container resources (such as container storage) are deemed to be within a container environment 120. By contrast, other elements may function outside the container environment 120, such as the local file system 108 and an operating system 107 of the computing system 100.

In FIG. 1 for the purposes of illustration, containerized applications 124 and 126 are deployed via the container orchestrator 122 locally on computing system 100. Thus, it may be said that the applications 124, 126 are remote to other nodes, such as computing system 110. The containerized applications 124, 126 may represent microservices, user applications, or the like, and may sometimes be referred to simply as containers. The container environment 120 may also host containerized applications (not shown) local to other computing systems in the cluster.

The container orchestrator 122 also deploys a containerized storage virtualization system 130, which will be described in more detail below. In the example of FIG. 1, the containerized storage virtualization system 130 is also executing locally on the computing system 100 and processing resource 102 thereof. In some implementations, other containerized storage virtualization systems of other computing systems in the cluster are also included in the container environment 120, although they are not depicted in FIG. 1. For example, the containerized storage virtualization system 130 may serve as a node in a storage virtualization platform having a cluster architecture, where multiple containerized storage virtualization systems (at least some of which may be executing on different and separate physical computing systems) cooperate to store and manage data in a storage virtualization layer.

The container orchestrator 122 may also include a standardized container storage interface 123. The container storage interface 123 has a plug-in architecture and can provision storage in the form of a persistent volume from a storage source using a corresponding one of a plurality of available container storage interface plug-ins 128. To "provision" storage may refer to the process of allocating a certain amount of storage capacity and making that allocation available to a consumer. Plug-ins 128 may be provided by various vendors and may expose (i.e., make available for use and/or consumption) an associated storage system to the container storage interface 123. Non-limiting examples of plug-ins include a block protocol plug-in (e.g., based on Internet Small Computer Systems Interface or iSCSI protocol), a file protocol plug-in (e.g., based on Network File System or NFS protocol, Common Internet File System or CIFS protocol, Server Message Block or SMB protocol), a public cloud persistent volume plug-in, and other plug-ins based on any other storage type (e.g., custom drivers). For convenience, individual ones of the plug-ins 128 may be referred to herein as a plug-in 128 (e.g., a block protocol plug-in 128 or a file protocol plug-in 128). A plug-in 128 may undergo an installation and setup process in the container environment 120 as required for that plug-in (e.g., populating credentials or other configuration details). In some cases, one or more of the plug-ins 128 may be running as a containerized application. However, a persistent volume provisioned through the plug-in 128 may be limited to a single type of storage corresponding to that plug-in. In contrast, the containerized storage virtualization system 130 disclosed herein advantageously may be useful for creating persistent volumes that blend multiple underlying storage types.

The containerized storage virtualization system 130 (also referred to as storage virtualization system 130) runs within one or more containers, and may be implemented in executable instructions 105. As will become evident, the storage virtualization system 130 provides an extra storage virtualization layer between a requesting application and one or more allocations of storage provisioned through the container storage interface 123. The storage virtualization system 130 includes a data path 132 and a control plane 140. The data path 132 includes data services provider 134, storage virtualizer 136, and a volume manager 138. The data path 132 also may include storage adapters 139 for accessing local storage (i.e., storage on the same computing system 100 on which the storage virtualization system 130 is hosted), such as a block adapter for mounting local physical storage 106, stacked file and block adapters for accessing local file system 108 as a block device, or other storage adapters.

The control plane 140 includes a policy engine 142 and a container storage interface API (application programming interface) 144. During an initialization phase of the storage virtualization system 130, the control plane 140 may receive from an administrator or the container orchestrator 122 a list of available container storage interface plug-ins 128 in the container environment 120. The control plane 140 may also acknowledge the storage adapters 139 available to the data path 132 for mounting local storage. The control plane 140 may also maintain a list of characteristics of the storage associated with each of those available plug-ins 128, such as performance characteristics (e.g. latency, IOPS or Input/Output Operations per Second, etc.), security characteristics (e.g., encryption, isolation, etc.), data protection characteristics (e.g., available RAID, or redundant array of independent disks, levels), cost characteristics (e.g., dollar per GB), or other characteristics.

The functionality of the data path functions 132 and control plane functions 140 will now be described in the context of providing storage to containerized applications 124, 126. A containerized application, such as application 124 may request storage from the container orchestrator 122. For example, the application 124 may need a persistent volume to store data. In some implementations, the application 124 may pass one or more requirements with the request, such as a capacity requirement, a performance requirement (e.g., latency, IOPS, etc.), a data protection requirement (e.g., RAID level), a cost requirement (e.g., dollar per GB), a security requirement, a tiering requirement (e.g., specified amounts of hot and cold storage), or other requirement. In some implementations, the container orchestrator 122 may maintain a storage abstraction called an orchestrator persistent volume in response to the request.

The container orchestrator 122 may use the container storage interface 123 to send the request to the storage virtualization system 130 through the container storage interface API 144 of the control plane 140 (with interface 144 acting as a server). In this manner, containerized storage virtualization system 130 may be understood to act as a storage provider to container orchestrator 122. In some implementations, the control plane 140 may assign an identifier to the request, such that each request can be individually identified, particularly with respect to the storage that will be provisioned for each request in the manner described herein.

The policy engine 142 of the container orchestrator 122 analyzes the request to determine what types of storage meet the requirements of the request. For example, the control plane 140 may have one or more of the following types available for storage provisioning: the physical storage 106, the local file system 108, a remote storage system 160, a virtualized storage 162, or public cloud storage 164. Additionally, more than one of any of the types of storage depicted may exist, but are not shown for clarity of illustration. For example, multiple remote storage 160 may be available from which to provision allocations of storage.

Remote storage system 160 as depicted in FIG. 1 may represent either a file system (e.g., a network-attached storage, or NAS, file server), block storage system (e.g., a storage area network, or SAN, storage device), or any other type of storage system that is remote to the computing system 100 and thus remote to the containerized storage virtualization system 130. For example, being remote may mean that the computing system 100 communicates with the remote storage system 160 via a network connection or the like.

Virtualized storage 162 may represent any existing persistent volume in a virtual environment, such as a persistent volume in the container environment 120 including container storage provisioned through the container storage interface 123 independent of the containerized storage virtualization system 130. In some examples, virtualized storage 162 may represent container storage provisioned by another container storage virtualization system other than system 130 (e.g., hosted on a different node than computing system 100). In some examples, virtualized storage 162 may represent storage provided by a virtual machine or hypervisor based software-defined storage platform.

The policy engine 142 may determine a mix of the foregoing storage types. For example, the policy engine 142 may compare the request to the available storage types to identify a closest match. To illustrate, the request may ask for certain amount of high speed storage and a certain amount of low cost, archival class storage. The policy engine may determine that physical storage 106 meets the high speed storage requirement (e.g., due in part to locality and being a high speed media in this example) and a block storage device 160 meets the low cost, archival class requirements. Additional example implementations of the policy engine 142 are described further herein, with respect to FIG. 2 for example.

Subsequently, the control plane 140 utilize the adapters 139 and/or container storage interface plug-ins 128 to provision each storage type in the determined mix and to acquire a mount point for each provisioned storage. A mount point allows access to the provisioned storage by a consumer, such as the data path 132 as will be described below.

As an example of local provisioning, the control plane 140 may use a block adapter from the adapters 139 to provision an allocation from physical storage 106 and acquire a local block mount point 170 (e.g., local host device mount point) to access that allocation. As another example, the control plane 140 may use stacked file and block adapters to provision an allocation from the local file system 108 and to acquire a local file system mount point 172 to access that allocation as a block device (i.e. "file as block device").

To provision storage via the plug-ins 128, the control plane 140 via the container storage interface API 144 communicates with the storage interface 123 to request that a plug-in 128 provision an allocation from its associated storage and provide a mount point back to the control plane 140. As an example, presuming the remote storage system 160 represents a remote block device (e.g., a SAN storage array external to the computing system 100), the control plane 140 may request (via 144 and 123) that a block protocol plug-in 128 (e.g., based on iSCSI protocol) provision an allocation from the block-type remote storage system 160 and provide a remote volume mount point 174 (e.g., iSCSI target and LUN, or Logical Unit Number) to access that allocation. As another example, the remote storage system 160 may represent a remote file device (e.g., a NAS file server), and the control plane 140 may request (via 144 and 123) that a file protocol plug-in 128 (e.g., based on NFS protocol) provision an allocation from the file-type remote storage system 160 and provide a remote volume mount point 174 (e.g., an IP address and export name under NFS) to access that allocation. In some implementations, the control plane 140 may utilize a block protocol plug-in 128 to provision from physical storage 106 or utilize a file protocol plug-in 128 to provision from the local file system 108, instead of using an adapter 139.

As another example of provisioning by way of a plug-in, the control plane 140 may request (via 144 and 123) that a plug-in 128 matching the virtualized storage 162 provision an allocation from the virtualized storage 162 and provide a virtualized storage mount point 176 to access that allocation. As another example, the control plane 140 may request (via 144 and 123) that a public cloud plug-in 128 provision an allocation from the public cloud storage 164. In return, the public cloud plug-in 128 may provide a public cloud persistent volume mount point 178 to access that allocation.

Although FIG. 1 depicts a local block mount point 170, a local file system mount point 172, a remote volume mount point 174, a virtualized storage mount point 176, and a public cloud persistent volume mount point 178, more or fewer mount points and mount points of any combination may be requested by the control plane 140 and acquired via the adapters 139 or plug-ins 128. In various instances, multiple local block mount points 170, multiple local file system mount points 172, multiple remote volume mount points 174, multiple virtualized storage mount points 176, and/or multiple public cloud persistent volume mount points 178 may be requested and acquired by the control plane 140. Moreover, the storage system 160 and the remote mount point 174 may represent respectively one or more of the same or different types of remote storage and a mount point thereof, including block, file, or other types of remotely accessible storage. The particular combination of storage mount points requested and acquired by the control plane 140 may depend on the storage request from the containerized application 124, and more particularly, may depend on the handling of that storage request by the policy engine 142.

Once the one or more storage mount points (e.g., 170, 172, 174, 176, or 178) have been acquired by the control plane 140 in accordance with the policy engine 142, the control plane 140 passes the acquired mount points to the data path 132. The control plane 140 may identify the mount points as being associated with a particular request, by associating the mount points with the request identifier for example. As will be described, the data path 132 consumes and blends (i.e., aggregates) the mount points to create a virtual persistent volume 156 presented by a mount point 180 to the requesting containerized application 124. In this manner, the allocated storage corresponding to the acquired mount points (e.g., 170, 172, 174, 176, or 178) may be referred to as the underlying storage (or similarly, backend storage) of the virtual persistent volume 156. The containerized application 124 thus reads and writes data to the virtual persistent volume 156. Before describing the creation of the virtual persistent volume 156, operational aspects of the data path 132 will first be described.

The data path 132 includes storage virtualizer 136, which maintains an object-based storage virtualization layer 150. A purpose of the storage virtualization layer 150 is to decouple where data is stored (i.e., storage allocations accessed via the mount points 170, 172, 174, 176, and/or 178) from how data is presented to a consumer of the data (e.g., containerized application 124). In this manner, data services such as migration, backup, snapshotting, replication, deduplication, compression, and others, may be performed on any mix of underlying storage and with decreased, minimal, or even no disruption to a consumer of the data.

An aspect of the storage virtualization layer 150 is that the storage virtualizer 136 stores data as "objects" in an object store 152. More particularly, the object store 152 may store different types of objects, including data objects and metadata objects. Data related to the containerized application 124, including files and/or directories, is made up of one or more data objects. Metadata objects may, among other things, be useful for organizing the data objects in a useful and orderly manner, as will be described below. In some implementations, each data object in the object store may be a fixed amount of data, such as 4 or 8 kibibytes of data for example, and metadata objects may also be a fixed amount of data, such as 1 kibibyte.

An object-based storage virtualization layer 150 may be different from block level storage (e.g., implemented in a SAN and presented via a storage protocol such as iSCSI or Fibre Channel) and file level storage (e.g., a file system which manages data in a file hierarchy and is presented via a file level protocol such as NFS or SMB/CIFS), although the object-based storage virtualization layer 150 may underlie block or file level storage protocols (e.g., by abstraction via mount points 180, 182 as will be described).

The storage virtualizer 136 maintains an object index 154, which tracks, for each object (data object and metadata object) in the object store 152, a signature, a physical address, and a reference counter. The signature of an object may be a cryptographic digest of the content of that object, using a hash function such as SHA-1, SHA-256, MD5, etc. Thus, the signature may also be referred to as a content-based signature. The reference counter in the object index 154 refers to the number of times the associated object is referenced across all the virtual persistent volumes (including 156, 158) in the storage virtualization layer 150.

The physical address in the object index 154 refers to the actual physical location of the object. In some examples, while the object store 152 may be understood to be a storage construct for describing the storage of objects within the storage virtualization layer 150, it may also be understood that the objects are stored physically on the underlying storage at the physical address. Because the data path 132 can consume multiple storage mount points, the particular mount point may be a part of the physical address. Additionally, the physical address may include a location within the storage allocation of a given mount point. For example, if the mount point pertains to physical storage 106, the physical address may include a logical block number. If the mount point pertains to public cloud storage 164, the physical address may include a reference to a cloud object in the syntax of the corresponding hosting provider. The volume manager 138 is configured to perform data reads and writes to specified physical addresses, such as the physical addresses stored in the object index 154.

In some implementations, the containerized storage virtualization system 130 may utilize an additional layer of indirection between the object index 154 and the actual physical location of objects. In such implementations, the volume manager 138 may assign and/or divide the underlying storage allocations at each mount point provided by the control plane 140 into extents (or also referred to as mini-volumes). The additional layer of indirection may be implemented by storing a virtual address instead of a physical address in the object index 154 in association with an object signature and maintaining an extent table that maps a given virtual address to an extent and thus the corresponding underlying storage. Thus, to access an object based on a virtual address, the volume manager 138 can first identify the extent targeted by the virtual address using the extent table and a first portion of the virtual address, and then locate the object within the extent using a second portion of the virtual address. In this manner, certain data services such as migration and tiering between extents may be performed in an efficient manner by updating just extent identifiers in the extent table, rather than updating a large amount of in-memory or persisted references to the data objects (i.e., each affected address in the object index 154) and regenerating various logical addresses, indexes, and other data structures utilized in managing the storage system.

Within the storage virtualization layer 150, the storage virtualizer 136 maintains one or more virtual persistent volumes backed by the object store 152. In some implementations, a containerized application will be associated with a virtual PV in a one-to-one relationship. For example, in the example illustration of FIG. 1, containerized application 124 is associated with virtual PV 156, and containerized application 126 is associated with virtual PV 158. In some implementations, each virtual PV is mapped by the container orchestrator 122 to a corresponding orchestrator persistent volume maintained by the container orchestrator 122, and the requesting containerized application 124 accesses the storage of the virtual PV 156 is accessed by via the orchestrator persistent volume.

In other cases, containerized applications and virtual PVs may be associated in one-to-many, many-to-one, or many-to-many relationships. For the sake of illustration only, virtual PVs will now be described with reference to virtual PV 156, although it should be understood that like description may apply to other virtual PVs such as virtual PV 158 and other virtual PVs not shown.

In an implementation, virtual persistent volume 156 may be an organization of metadata objects and data objects stored in the object store 152, where the organization hierarchically relates the data objects by associated content-based signatures up to a root object. In an example, the virtual PV 156 may be a Merkle tree (also referred to as a hash tree) or any other hierarchical arrangement (e.g., directed acyclic graphs, etc.). In the case of a hierarchical Merkle tree, data objects may be located at the lowest tree level of any branch (also referred to as the leaf level, which is most distant from the root object) and such data objects may be referred to as leaf data objects. As described above, data objects make up the data of the containerized application 124, such as files and directories.

Within the hierarchical arrangement, a parent object refers to an object that includes as its content the signatures of child objects. For example, a parent object of leaf level data objects is a metadata object that stores as its content the signatures of its child leaf level data objects. In this manner, the signatures of objects at each level are collected in parent objects at a next level higher in the hierarchical arrangement until the root object is reached. Thus, the root object also is a metadata object that stores as content the signatures of respective child objects. From another perspective, the hierarchical arrangement expands in a direction from the root object to the leaf level—a metadata object at any given level may expand to a number of child nodes dictated by a predefined branching factor. A metadata object may be able to store a quantity of signatures that is at least equal to a branching factor of the hierarchical arrangement, so that it may hold the signatures of all child objects.

Any change in the data of the virtual PV (i.e., new data, modified data, deleted data) translates to a change in the content of one or more leaf level data objects, which will precipitate a change in the content-based signatures of those changed data objects, which will cause content and signature changes to propagate through parent nodes upward to the root object. Thus, a virtual PV 156 at a given point in time (also referred to as a snapshot in time) may be identified uniquely by its root object, and more particularly, identified by its root object signature.

Another aspect of virtual PV 156 is that, in some implementations, a given file or directory from among the containerized application 124 may be stored in a corresponding subtree arrangement within the virtual PV 156. In other words, the virtual PV 156 may be delineated into subtrees, each of which correspond to a respective file or directory of the containerized application 124.

Because files and directories are made up of one or more data objects and those data objects are arranged in the virtual PV 156 and subtrees thereof by reference to associated data object signatures, in some implementations each of the data objects may be physically stored just once in the object store 152 and referred to by their respective signatures in multiple metadata objects in the virtual PV 156 or in any other virtual PV (e.g., 158) in the storage virtualization layer 150. Thus, data may be deduplicated in this manner by the storage virtualizer 136. Similarly, metadata objects can be stored once and referred to multiple times by corresponding signatures. The number of times a data object or metadata object is referenced in the storage virtualization layer 150 may be recorded in the corresponding reference counters of the object index 154. In some implementations, deduplication of data may be performed inline during a write operation, in contrast to post-processed or near-line deduplication, and in this manner, storage of data may be described as natively deduplicated in the storage virtualization layer 150 and among the virtual PVs 156, 158.

In use cases where security is a consideration, including multi-tenancy scenarios, separate object stores may be utilized for each sensitive security domain. Thus, sensitive data may be isolated to a secured object store without participating in the deduplication of other virtual PVs not within the security domain.

In order for the containerized application 124 to access the virtual PV 156, the data path 132 may provide a mount point 180. The data path 132 can provide any type of mount point from a plurality of types of mount points, including without limitation, a block type mount point (e.g., iSCSI compatible), a file type mount point (e.g., a Filesystem in Userspace or FUSE interface, or NFS, SMB, or CIFS compatible), a key/value share mount point (e.g., a noSQL volume or an Amazon S3 compatible API), and other types of mount points. In this manner, the mount point may be understood to contribute to complete storage access abstraction, because the containerized application 124 is provided with whatever type of storage access is required by the containerized application 124 (e.g., file protocol or block protocol, etc.) regardless of the underlying type of storage that makes up the virtual PV 156 (e.g., regardless of software-based or hardware-based, block or file, local or remote, etc.).

The type of mount point, that is, the type of abstraction, may be user selected or may be predefined according to the containerized application 124 requesting the storage (i.e., based on a class of containerized application, dictated by the container orchestrator 122, etc.). The type of abstraction may be indicated to the containerized storage virtualization system 130 via the storage request received at the control plane 140.

In the example of FIG. 1, the containerized storage virtualization system 130 also may provide a mount point 182 to containerized application 126 to access a virtual persistent volume 158 created in response to a request for storage from the containerized application 126 to the container orchestrator 122, in a manner similar to that described above for the mount point 180 of virtual PV 156 for containerized application 124. The virtual PVs 156 and 158 may both include respective Merkle trees for organizing respective sets of data, while the object store 152 stores the data of both virtual PVs 156 and 158 in a deduplicated manner.

In operation (i.e., after the virtual PV 156 is created and mount point 180 provided to application 124), the storage virtualization system 130 may service input/output (I/O) requests from the containerized application 124 directed to a virtual PV 156 via the mount point 180. For example, to serve a read request received through the mount point 180, the storage virtualizer 136 may identify the signatures of data objects in the virtual PV addressed by the read request (i.e., which may include walking the Merkle tree structure of the virtual PV based on an address of the read request) and determine the physical addresses of those data object signatures from the object index 154. In some implementations, the physical address of a data object may specify the mount point of the underlying storage allocation where the data object is stored (e.g., one or more of mount points 170, 172, 174, 176, or 178). The storage virtualization system via the volume manager 138 may then read the data objects using the physical addresses (or using a virtual address and extent table as described above) and return the read data to the containerized application 124 through the mount point 180.

To serve a write request, the storage virtualizer 136 may, in example implementations, receive the data to be written to the virtual PV 156 from the containerized application 124, check whether the data includes any data objects that are new to the object store 152 based on content-based signatures, and write to the object store the new data objects (i.e., data objects that do not already exist in the data store). In some implementations, the storage virtualizer 136 may compress the new data objects before writing to the object store 152. The process of writing to the object store 152 in particular may involve controlling to which underlying storage allocation (e.g., 106, 108, 160, 162, or 164) the new data objects are written. In some implementations, the containerized application may indicate in the write request to which underlying storage allocation to write the data. In some implementations, new data may be written by default to a local storage portion of the virtual PV 156, such as locally attached physical storage 106, which may provide "hot" tier storage optimized for frequent access. In some implementations, the containerized application may indicate a particular policy or service level agreement for writing the data and the storage virtualization system may determine which underlying storage allocation meets that policy or SLA. The storage virtualization system then utilizes the mount point (e.g., 170, 172, 174, 176, or 178) corresponding to that underlying storage allocation to write the data objects. The storage virtualization system also adds the signature of data objects to metadata objects of the virtual PV 156.

Representing data in a virtual PV 156 that is natively deduplicated and uniquely identified by a root object signature may enable efficient data services, including those provided by data services provider 134. For example, data services provider 134 may perform, without limitation, snapshot-based back up, replication, migration, tiering, redundancy-based data protection (e.g., redundant array of independent nodes, also referred to as RAIN; or RAID), or other capabilities. The data services provider 134 may perform the data services with the virtual PV 156 in a manner that is transparent or non-disruptive to the containerized application 124. For example, the data services can be performed without modifying the mount point 180 and in the case of some data services, without input or instruction (e.g., configuration details, set up commands, etc.) from a user, the containerized application 124, or the container orchestrator 122. Moreover, in some examples, the data services provider 134 may manipulate data primarily at the storage virtualization layer 150, such that the data services are performed in a manner that is irrespective of the different underlying storage mounts and the particular composition of the virtual PV 156. In other words, the data services provider 134 can consistently perform a common set of data services regardless of what type of underlying storage makes up the virtual PV 156 in a non-disruptive manner. The foregoing technical benefits may be made possible by virtue of, for example, the virtual PV 156 decoupling the underlying storage from the containerized application 124.

For example, data services provider 134 may perform an efficient snapshot-based backup data service. In some implementations, the difference between snapshots in time of a hierarchically arranged virtual PV 156 can be efficiently accomplished by comparing object signatures in a top-down iterative manner starting at the root object to find metadata and data objects that differ. For example, in an operation to back up a current state of the virtual PV 156 (i.e., a current snapshot), the current snapshot may be on a primary system (e.g., computing system 100) and an older, previously backed up, snapshot may already exist on a backup system (e.g., computing system 110). In that example, the difference between the current snapshot and the older snapshot may be determined by comparing signatures of the snapshots in the previously described manner, and the backup system may be searched to determine if the metadata or data objects that differ already exist on the backup system (i.e., in an object store of the backup system). Only those metadata or data object that do not exist are copied from the primary system to the backup system, thus reducing the amount of data traffic and improving backup times. In other implementations, snapshot-based backups may be made on the same primary system instead of or in addition to the backup system in a similar manner.

The snapshot-based backup may be performed on a scheduled basis for example, without disrupting the containerized application 124. Moreover, the snapshot-based back up may be performed primarily at the software virtualization layer 150, thus avoiding complexities of managing each individual underlying storage directly. Similar to the backup process, a restoration process may also proceed with a comparison of the metadata or data objects to be restored and the objects already existing on the restoration target, and a transmission of only that data that does not exist on the restoration target.

The data services provider 134 may also perform a migration operation. The migration may move data objects between different ones of the underlying storage within a virtual PV 156, including between different local storage, between local and remote storage, between different remote storage, between different public cloud storage, between public cloud storage and non-public cloud storage (either local or remote), or between other combinations of underlying storage. The migration is handled at the storage virtualization layer 150 by associating the new physical address of a moved data object to the unchanged content-based signature in the object index 154, thus making the migration transparent to the containerized application 124.

As another example, the data services provider 134 may migrate the virtual PV 156 to a different computing system. For example, in some cases, it may be useful to migrate a virtual PV 156 to be close to a workload using the virtual PV 156. In an example scenario, the container orchestrator 122 may move the containerized application 124 to a different computing system (e.g., from source computing system 100 to destination computing system 110) for the sake of load balancing or another reason, and the virtual PV 156 may need to be migrated to be close to the containerized application 124. In some implementations, the storage virtualization system 130 may migrate management of the virtual PV 156 to another storage virtualization system on the destination computing system 110 to which the containerized application 124 was migrated. The data services provider 134 may also migrate some of the data in the virtual PV 156, such as migrating data objects that were local to the computing system 100 (e.g., on underlying physical storage 106) to the physical storage of the different computing system 110, which may be useful for maintaining storage locality and other performance characteristics of the virtual PV 156. Such migration may involve identifying whether the destination computing system 110 already has a copy of metadata or data objects to be migrated, and transmitting only data objects that do not exist on the destination computing system 110. At the same time, the same mount point 180 may be maintained and undisrupted for the containerized application 124.

The data services provider 134 may also perform data tiering within a virtual PV 156, that is, moving data between different types of underlying storage that may offer different characteristics and comply with different storage policies. For example, tiering may be implemented by virtue of assigning and/or dividing the constituent storage allocations of the virtual PV 156 to different extents, as previously described. Under certain triggering conditions, the data services provider 134 (in conjunction with the volume manager 138 in some implementations) may move data objects from one extent to a different extent, and update the extent table accordingly. Example triggering conditions may include an increased security status of data which may cause the data services provider 134 to move that data from public cloud storage 164 to non-cloud storage 106, 108, 160, or 162; aging of data which may cause the data services provider 134 to move that data to an archival class of storage (e.g., remote storage 160); recent frequent access of data which may cause the data services provider 134 to move that data to high performance storage (e.g., local physical storage 106); or other types of conditions. By virtue of moving and managing data at the storage virtualization layer 150, data tiering may be performed across any type of underlying storage and without disrupting the mount point 180 or containerized application 124.

The data services provider 134 may also support redundancy based data protection. For example, the data services provider 134 may provide RAID data protection. For example, the data services provider 134 (in conjunction with the volume manager 138 in some implementations) may create a RAID set across underlying storage allocations or within an underlying storage allocation (e.g., in cases where local physical storage 106 includes a set of drives). The data services provider 134 may feature a software RAID controller or cooperate with a hardware RAID controller to write objects of the virtual PV 156 to the RAID set according to a RAID scheme such as RAID 1, RAID5, or RAID 6.

The data services provider 134 also may provide RAIN data protection by replicating or mirroring data of a virtual PV 156 (also referred to as a primary virtual PV for ease of discussion) for data protection and high availability purposes in keeping with RAIN architecture principles. In some implementations, the data services provider 134 may replicate or mirror data at inception when the data comes in to the storage virtualization layer 150 as a write request from the containerized application 124. In some implementations, the replicated data may form a virtual PV replica, which may have a form similar to a virtual PV (e.g., including a Merkle tree) and may be managed by and local to a different storage virtualization system on a different computing system 110, relative to the primary virtual PV that is local to computing system 100. Additionally or alternatively, the virtual PV replica may be made up of underlying storage that is different and/or separate from the underlying storage that makes up primary virtual PV 156. Thus, if data on the primary virtual PV is unrecoverable, the data may be restored from the virtual PV replica using a failover procedure.

To summarize, by virtue of a containerized storage virtualization system 130 aggregating various types of storage into a virtual persistent volume that can be presented as any number of available storage abstractions, the container storage data path can be highly virtualized from end to end. Thus, users of containerized applications may be afforded a high degree of flexibility in requesting any composition of underlying storage to suit performance needs (or other needs) of an application while also being able to consume the storage using any type of abstraction suitable for the application. Moreover, a consistent set of storage services may be provide regardless of the composition of underlying storage and regardless of the type of storage access abstraction used to present the virtual PV.

Figure 2:
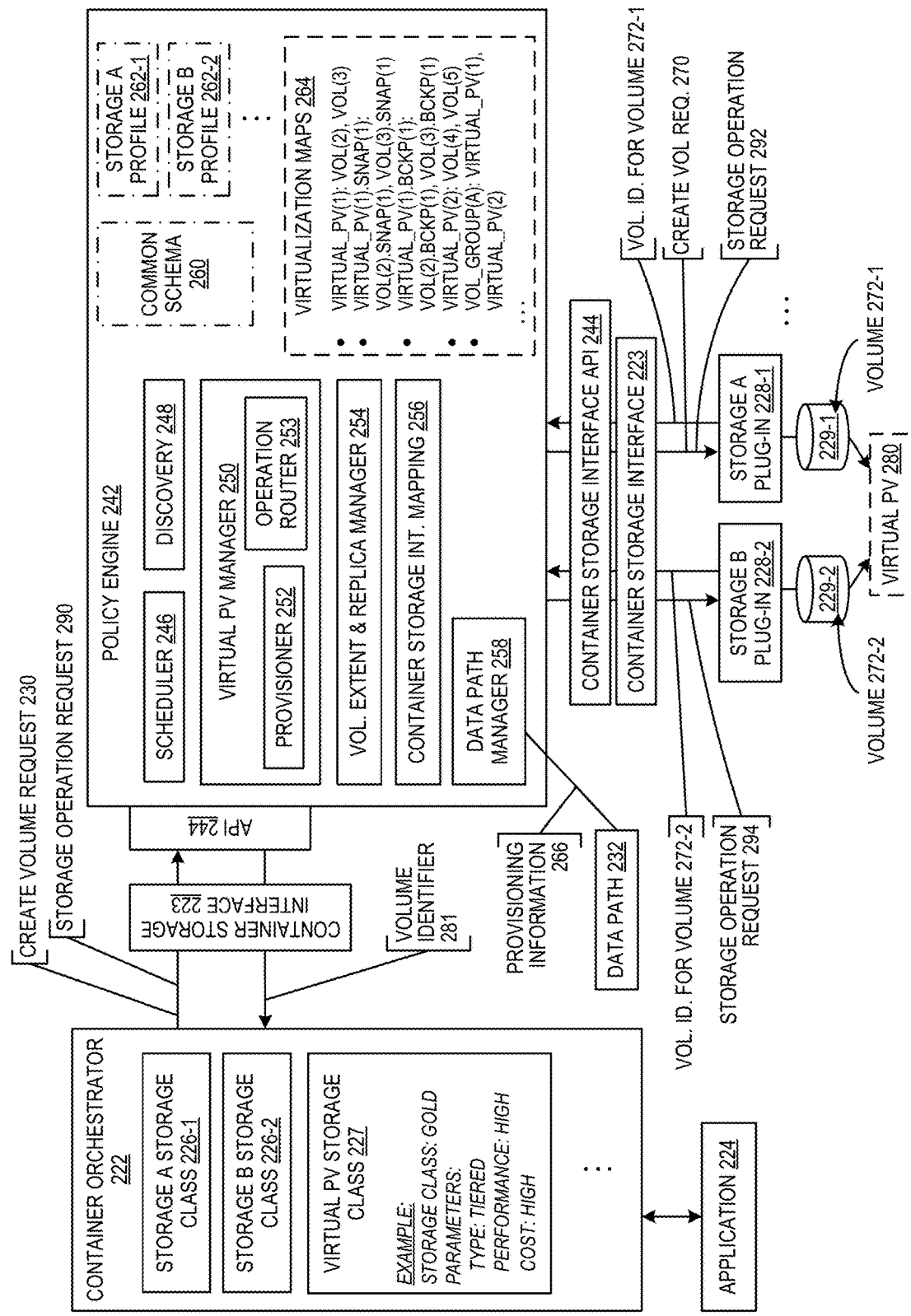
FIG. 2 depicts an example system that relays a storage operation request to a storage system corresponding to an underlying storage volume of a virtual persistent volume.

FIG. 2 depicts an example system that includes a policy engine 242. FIG. 2 also depicts other elements, including a container orchestrator 222, a container storage interface 223, a containerized application 224, a data path 232, a container storage interface API 244, and one or more storage plug-ins (e.g., a storage plug-in A 228-1, a storage plug-in B 228-2). In some implementations, the foregoing elements of FIG. 2 may be deemed to exist within a same container environment. The policy engine 242 and elements of FIG. 2 (i.e., 222, 223, 224, 232, 244, 228-1, 228-2) may each be implemented as hardware or any combination of hardware and programming to implement their respective functionalities as described herein. For example, the programming may be processor executable instructions stored on a non-transitory machine readable medium and the hardware may include a processing resource to retrieve and/or execute those instructions. For example, such a machine readable medium and the processing resource may be analogous in many respects to the machine readable medium 104 and the processing resource 102 of FIG. 1, respectively. Hardware may also include electronic circuitry or logic.

The container orchestrator 222 may be analogous in many respects to the container orchestrator 122 described above. The container orchestrator 222 may serve as a platform for deploying and managing containerized applications, such as containerized application 224, which may be similar to containerized applications 124, 126 described above. The container orchestrator 222 may include a container storage interface 223, which may be analogous to container storage interface 123 described above. The container storage interface 223 may enable a plug-in to expose (i.e., make available for use and/or consumption) a storage system to the container orchestrator 222 and an associated container environment. For example storage A plug-in 228-1 may expose storage system 229-1 to the container orchestrator 222, and storage B plug-in 228-2 may expose storage system 229-2 to the container orchestrator 222. The plug-ins 228-1 and 228-2 (also referred to generally as plug-in(s) 228) may be similar to plug-ins 128 described above, and any of the storage systems 229-1 and 229-2 (also referred to generally as storage, storage type(s), or storage system(s) 229) may be local storage devices (e.g., locally attached disk drives), local or remote storage arrays, software-defined storage, cloud storage, or the like, and may be similar to any of the storage systems or storage types described above, such as the physical storage 106, the local file system 108, the remote storage system 160, the virtualized storage 162, or the public cloud storage 164.

For a storage plug-in 228 that is deployed at the container orchestrator 222, the container orchestrator 222 may maintain an object called a storage class that includes parameters (e.g., in the form of key/value pairs) describing an associated storage 229. A storage class may describe characteristics of the storage being offered (e.g., provisionable as a persistent volume through the container storage interface 223), and the described characteristics may include quality of service levels, backup policies, capacity, cost, performance (e.g., IOPS, latency), redundancy, recovery time objective (RTO), recovery point objective (RPO), or other measures. Different storage classes may describe different storage offerings. In some instances, a storage 229 associated with one vendor may have multiple storage classes. Different storage 229 from different vendors may have different storage classes. Storage classes may be non-standardized, between vendors or even within a vendor, since different storage classes may use different parameters. In FIG. 2, storage A plug-in 228-1 may have at least one associated storage A storage class 226-1, and storage B plug-in 228-2 may have at least one associated storage B storage class 226-2. Storage classes, such as storage A storage class 226-1 and storage B storage class 226-2, may be referred to herein generally as storage class(es) 226. Although two storage plug-ins 228 and two storage systems 229 are depicted in FIG. 2 as an example, more or fewer storage plug-ins and/or storage classes may be present and available in various implementations.

In some implementations, the policy engine 242 may form at least part of a storage virtualization system. For example, the policy engine 242 may serve as or form part of the containerized storage virtualization system 130 of FIG. 1, and more particularly, may serve as or form part of the control plane 140 and/or the policy engine 142 of FIG. 1. As will be described, the policy engine 242 may be useful for, among other things, virtualizing control plane operations to provide containerized applications (e.g., application 224) with a virtual persistent volume backed by one or more types of available storage to meet a policy goal, despite the available storage types being described by non-standardized storage classes. Moreover, as will be described below, the policy engine 242 may intelligently manage storage operation requests directed to the virtual persistent volume by, among other things, routing the storage operation request to the various storage types backing the virtual persistent volume in a multi-cast fashion.

The policy engine 242 may include and/or interact with one or more elements that each may be implemented as hardware or any combination of hardware and programming to implement their respective functionalities as described herein. In some implementations, the policy engine 242 may include a scheduler 246, a discovery agent 248, a virtual PV manager 250 that includes a provisioner 252 and an operation router 253, a volume extent and replica manager 254, a container storage interface mapping 256, and/or a data path manager 258. In some implementations, the policy engine 242 may communicate with the container storage interface 223 (for example, communicate bidirectionally) via a container storage interface API 244, which may be analogous to container storage interface API 144 described above. In some implementations, the policy engine 242 may communicate with a data path 232, which may be analogous to the data path 132 described above, via the data path manager 258 for example.

The discovery agent 248 may determine what plug-ins 228 and associated storage 229 are available in the container environment. Additionally, the discovery agent 248 may retrieve storage classes 226 corresponding to the discovered plug-in(s) 228 and storage 229 and register the retrieved storage classes 226 to the policy engine 242. For example, the discovery agent 248 may collect the foregoing information about plugins 228, storage 229, and storage classes 226 by querying the container orchestrator 222 or container storage interface 223.

In some implementations, the discovery agent 248 may operate at start up or during an initialization phase of a storage virtualization system to which the policy engine 242 belongs and/or may operate periodically while the storage virtualization system is running. As an illustration, a non-limiting example of a container environment may include three to six types of storage plug-ins 228. In various implementations, there may be one or more storage classes for each plug-in 228.

The storage classes 226 registered by the policy engine 242 may be non-standardized, as discussed above. In other words, different storage classes may use different parameters, or more specifically, different keys and/or different values for parameters defined as key/value pairs. The policy engine 242 may utilize a common schema 260 to translate each storage class 226 into a corresponding storage profile. For example, storage A storage class 226-1 may be translated into storage A profile 262-1, and storage B storage class 226-2 may be translated into storage B profile 262-2. Storage profiles, such as storage A storage profile 262-1 and storage B storage profile 262-2, may be referred to herein generally as storage profile(s) 262. In some implementations, the common schema 260 may be manually coded, based on administrator knowledge of the storage classes 226 for example. The common schema 260 may be understood to be a mapping between vendor specific storage class parameters and a common language. In some implementations, as will be described below, the common language of the common schema 260 may be designed in correlation with the creation of virtual PV storage class 227. In some implementations, the storage profiles 262 may be static, in that they are not expected to change after the translation.

To illustrate, the common schema 260 may be useful if a same performance level in storage A storage class 226-1 and storage B storage class 226-1 have values of A and B respectively, and thus are translated into a same performance level value X in storage A profile 262-1 and storage B profile 262-2. Thus, storage profiles 262-1 and 262-2 (translated from storage classes 226-1 and 226-2 respectively) use a common language to describe storage offerings for storage 229-1 and 229-2, respectively.

The policy engine 242 may also present or publish one or more virtual PV storage classes 227 to the container orchestrator 222. A virtual PV storage class 227 may be exposed to users, alongside storage classes 226. Similar to storage classes 226, a virtual PV storage class 227 may describe characteristics of a provisionable persistent volume, and in particular, a persistent volume provisionable from the policy engine 242 or from a storage virtualization system that includes the policy engine 242. In some implementations, a virtual PV storage class 227 and a virtual PV provisioned according to the virtual PV storage class 227 may be deemed to have or meet a default or initial storage policy.

Different virtual PV storage classes 227 may be presented or published to the container orchestrator 222, such as storage classes for different service levels, such as gold, silver, and bronze, each with different parameters. For example, each of the different virtual PV storage classes 227 may be designed by an administrator for different virtual storage policy purposes or may be pre-defined by a vendor providing the policy engine 242. Solely for the purposes of illustration, the virtual PV storage class 227 depicted in FIG. 2 has example characteristics of being a "gold" storage class with parameters of type:tiered, performance:high, and cost: high.

Unlike the storage classes 226, the virtual PV storage class 227 natively conforms to the common schema 260. In other words, the key/value pairs of the virtual PV storage class 227 are in the same language as the common schema 260 and do not need further translation. In some implementations, the virtual PV storage classes 227 may be defined first, and the common schema 260 may be created based on the parameters of the virtual PV storage classes 227.

The application 224, either autonomously or via user input, may request a persistent volume from the container orchestrator 222. The request may also include provisioning requirements, such as an indication that the virtual PV storage class 227 is the desired storage class for the requested persistent volume. Other requirements passed with the request may include a desired capacity, for example. The container orchestrator 222 may in turn pass a create volume request 230, via the container storage interface 223 and the container storage interface API 244 for example, to the policy engine 242. In some implementations, the container orchestrator 222 may extract the parameters of the virtual PV storage class 227 and pass the parameters with the request 230 to the policy engine 242. The request 230 may be received within the policy engine 242 by the virtual PV manager 250.

The virtual PV manager 250 may include various operators for manipulating virtual PVs managed by the policy engine 242, including operators to provision new virtual PVs, delete virtual PVs, handle read/write I/O requests directed to virtual PVs, or other operations. These operators may each be hardware or a combination of hardware and programming to implement their respective functionalities. For example, the virtual PV manager 250 may include a provisioner 252 operator to provision new virtual PVs. The virtual PV manager 250 may also include an operation router 253 operator to route storage operations for existing virtual PVs (e.g., backup or restore operations) to their underlying storage systems (also referred to as backend storage systems). The functionality of the virtual PV manager 250 and the provisioner 252 and operation router 253 thereof will now be discussed in greater detail.

In response to the request 230, the provisioner 252 begins the process of creating a virtual PV that will ultimately be returned as virtual PV 280 (i.e., including at least a volume identifier) to the container orchestrator 222 for consumption or use as persistent storage by the containerized application 224. The provisioner 252 determines that the virtual PV storage class 227 was identified in the request 230 as being the desired type of virtual PV to create. The provisioner 252 then assesses each parameter in the requested virtual PV storage class 227 and determines which storage profile 262 has a corresponding parameter that can meet and fulfill the virtual PV storage class 227 parameter. In some implementations, a parameter in the virtual PV storage class 227 is a minimum, such that a closest match of corresponding parameter among the storage profiles 262 exceeds the parameter value in storage class 227. This matching of virtual PV storage class 227 parameter to a parameter of a storage profile 262 is made possible by virtue of the virtual PV storage class 227 and the storage profiles 262 all being compliant with and in the language of the common schema 260. For example, if a requested parameter indicates performance:high, the provisioner 252 would identify a storage profile 262 that also includes performance:high.

In some implementations, the provisioner 252 may match the parameters of virtual PV storage class 227 to parameters of storage profiles 262 on a best fit basis. For example, if no parameters of storage profiles 262 were found that match or exceed the virtual PV storage class 227 parameters, the closest parameter may be selected. For example, if a requested parameter indicates performance:high, the provisioner 252 may select a storage profile with performance: medium over other storage profiles with performance:low.

In some implementations, the provisioner 252 may also determine whether matching the virtual PV storage class 227 to a particular storage profile 262 would violate a resource limit or quota of an associated plug-in 228, and if a violation would occur, avoid matching to that plug-in 228. In some implementations, the provisioner 252 may check remaining capacity of a storage 229 using an out-of-band query command (e.g., not via plug-ins 228, container storage interface API 244, or container storage interface 223).

In some implementations, the provisioner 252 may determine that multiple storage profiles 262 (e.g., more than one) may be combined to meet a parameter of the virtual PV storage class 227. For example, a request 230 may request performance:high and 2 terabyte (TB) capacity. However, in this illustration, storage profiles 262-1 and 262-2 with performance:high parameters are limited to 1 TB volumes, either due to remaining capacity or other resource limitations. In this instance, the provisioner 252 may determine to combine 1 TB of capacity from each of storage profiles 262-1 and 262-2 to fulfill the request for 2 TB performance: high.

In some cases, the provisioner 252 may determine that a single storage profile 262 fulfills all of the parameters virtual PV storage class 227. In some cases, the provisioner 252 may determine that multiple different storage profiles 262 are required to fulfill the parameters of the virtual PV storage class 227. For example, a virtual PV storage class 227 may be of a tiered type and may specify high performance primary storage (e.g., with low latency and/or high IOPS) in a first parameter and archival class storage (e.g., with low cost and/or high write speed) for backup in a second parameter. In this example, presuming that storage A profile 262-1 is associated with a high performance storage array 229-1 and storage B profile 262-2 is associated with an archival/backup storage system for illustration purposes, the provisioner 252 may determine that first parameter is fulfilled by the storage A profile 262-1 and the second parameter is fulfilled by the storage B profile 262-2.

Ultimately, the provisioner 252 may create a mapping of the parameters of the virtual PV storage class 227 to parameters of one or more storage profiles 262 serving as proxies for the storage classes 226, such that the parameters of the virtual PV storage class 227 are fulfilled. Thus, the provisioner 252 also identifies the plug-ins 228 (corresponding to the mapped storage profiles 262) to be used to compose a virtual PV having the characteristics of virtual PV storage class 227.

The provisioner 252 coordinates with the container storage interface mapping 256 to provision volumes from each of the storage plug-ins 228 associated with the mapped profiles 262, using their associated storage classes 226. The provisioner 252 informs the container storage interface mapping 256 of the profiles 262 and the plug-ins 228 that the provisioner 252 identified and mapped to virtual PV storage class 227, and the container storage interface mapping 256 handles low level replacement of each parameter in the virtual PV storage class 227 with one or more of provisioned volumes using the plug-ins 228 identified by the provisioner 252. In this process, the container storage interface mapping 256 may translate parameters of the virtual PV storage class 227 to parameters in the storage classes 226 and then provision volumes using the plug-ins 228 and those translated parameters (since the plug-ins 228 are compatible with the storage classes 226). Provisioning volumes using plug-ins 228 may be similar to provisioning described above in FIG. 1 using plug-ins 128.

To illustrate, if the provisioner 252 determined that storage A profile 262-1 fulfilled a first parameter of the virtual PV storage class 227, the container storage interface mapping 256 may translate that first parameter to a corresponding parameter of storage A storage class 226-1 using the common schema 260 and then issue a create volume request 270 indicating the translated storage A storage class 226-1 parameter (and in some examples, additional parameters such as capacity), via the container storage interface API 244 and the container storage interface 223, to the storage A plug-in 228-1. In turn the storage A plug-in 228-1 provisions storage from the storage system 229-1 according to the request 270 and returns a volume 272-1, which may be identified by a volume identifier or a persistent volume object or other control plane means for handling a provisioned volume. The container storage interface mapping 256 may repeat the process, sequentially or in parallel, for each parameter of the virtual PV storage class 227. Another provisioning request may return a volume identifier or other handle for volume 272-2 from storage system 229-2 via storage B plug-in 228-2. In other examples, more or fewer storage volumes may be returned. Volumes 272-1 and 272-2 may be referred to collectively as volumes 272 or generally as a volume 272.

In some implementations, the volume extent and replica manager 254 and/or the data path manager 258 (in conjunction with the data path 232) may provide further functionality for creating and/or managing the virtual PV. Functionality of the volume extent and replica manager 254 may interoperate with the data path manager 258/data path 232 or may be independent of the data path manager 258/data path 232.

In some implementations, the data path manager 258 may send provisioning information 266 to the data path 232. The provisioning information 266 may be information about the volumes provisioned via plug-ins 228 to fulfill the virtual PV storage class 227, such as type(s) of storage, volume identifiers, etc. (e.g., identifying information about volumes 272). The data path 232 may then consume those provisioned volumes to create the virtual PV, in a manner similar to that described above with respect to FIG. 1. In particular, the data path 232 may create the virtual PV to be an organization (e.g., Merkle tree) of metadata objects and data objects, stored in the object store, that are hierarchically related by associated content-based signatures up to a root object. In some implementations, the hierarchically-organized, object store-backed virtual PV is returned to the container orchestrator 222 as the virtual PV 280, and the data path 232 may be involved with servicing I/O requests as described above.

An extent, also referred to as a mini-volume, refers to a unit of organization within the virtual PV. The virtual PV may comprise a single extent (corresponding to a single provisioned volume, for example) or multiple extents. An extent may be aligned with a particular volume provisioned via a plug-in 228 or a subdivision thereof. Dividing the virtual PV into extents may allow I/Os to be efficiently directed to the intended target, such as in the case of tiered storage with high performance tier extents for hot data and archival or backup tier extents for cold data. In this manner, a single virtual PV may have automated built-in tiering capabilities, thus making data tiering simple and invisible to users and administrators. In another example, extents may be useful for managing separate volumes that are to be combined to meet a given parameter of a virtual PV storage class. The volume extent and replica manager 254 may manage extents using an extent table in a manner similar to that described above with respect to FIG. 1 or may offload some or all of such management to the data path 232.

In some implementations, the volume extent and replica manager 254 may coordinate a backup policy specified by the virtual PV storage class 227, throughout the lifecycle of the virtual PV. During the provisioning stage (i.e., after the provisioner 252 has identified primary storage and backup storage from profiles 262 to fulfill the virtual PV storage class 227), the volume extent and replica manager 254 may coordinate with the container storage interface mapping 256 to first provision a backup volume (e.g., from a backup storage system 229-2 via plug-in 228-2) and then provision a primary storage volume (e.g., from a primary storage system 229-1 via plug-in 228-1) using a provisioning request that identifies the backup volume as a replication target. The storage system hosting the primary storage volume (e.g., storage system 229-1) may then utilize its own replication mechanism to backup data to the backup volume (e.g., at storage system 229-2) identified in the provisioning request. In some implementations, a scheduler 246 may operate to schedule backups at a frequency or schedule (e.g., as defined in the virtual PV storage class 227). At each scheduled instance, the scheduler 246 may instruct the primary storage volume plug-in (e.g., 228-1) to backup data to the target backup volume. In this manner, a single virtual PV 280 may include automated backup, thus simplifying backup configuration and maintenance for users and administrators.

Once the one or more volumes have been provisioned via plug-ins 228 in accordance with the virtual PV storage class 227-to-storage profile(s) 262 mapping, a volume mapping is recorded in the virtualization maps 264 data structure that maps the constituent provisioned volumes to the virtual PV being created. In FIG. 2, the virtualization maps 264 show various example mappings for various illustrations described herein, but it should be understood that the virtualization maps 264 may include more or fewer mappings and/or mappings of different types. As one example of a mapping, if a VOL(2) was provisioned from the storage A plug-in 228-1 (e.g., VOL(2) being a volume identifier for volume 272-1) and a VOL(3) was provisioned from the storage B plug-in 228-2 (e.g., VOL(3) being a volume identifier for volume 272-2) in order to fulfill the virtual PV storage class 227, then a mapping of VIRTUAL_PV(1) (volume ID for virtual PV 280) being composed of VOL(2) and VOL(3) is recorded into the virtualization maps 264 as depicted in FIG. 2. It should be understood that the foregoing is an illustration, and that a virtual PV may be made up of more or fewer provisioned volumes. As multiple virtual PVs are requested (e.g., for the same virtual PV storage class or different virtual PV storage classes), additional mappings are stored in the virtualization maps 264 data structure. In this sense, the virtualization maps 264 data structure may be deemed dynamic, because new maps may be added as new virtual PVs are created and existing maps may be deleted as virtual PVs are deleted.

The policy engine 242 may return the virtual PV 280 by sending at least the virtual persistent volume identifier 281 (e.g., the volume ID VIRTUAL_PV(1)) to the container orchestrator 222 via container storage interface API 244 and container storage interface 223, and the container orchestrator 222 may in turn provide the containerized application 224 with access to the virtual PV 280. The container orchestrator 222 may attach or associate the virtual PV identifier 281 of the virtual PV 280 to the containerized application 224 in metadata of the container orchestrator 222. Subsequently, the containerized application 224 may perform read and/or writes to the virtual PV 280. The storage virtualization system to which the policy engine 242 belongs can service I/O requests directed to the virtual PV 280 by mediating those I/O requests with the volumes of storage 229 mapped to the virtual PV 280.

In various implementations and scenarios, the nature of the virtual PV 280 provided by the policy engine 242 may differ. For example, if a single underlying volume is mapped and provisioned for the virtual PV storage class 227, then the policy engine 242 may provide the provisioned volume (e.g., a volume 272) directly as virtual PV 280, without involving the data path 232. In another example, a single underlying provisioned volume (e.g., a volume 272) may be passed to the data path 232 and virtualized as described above (e.g., as a hierarchical structure of objects identified by content-based signatures), and that data path virtualized storage is provided as virtual PV 280. In another example, multiple underlying volumes (e.g., volumes 272-1, 272-2) are mapped and provisioned for the virtual PV storage class 227, those volumes are virtualized through the data path 232 as described above, and that data path virtualized storage is provided as virtual PV 280. For example, in FIG. 2, a virtual PV 280 depicted in dashed lines comprises a volume from storage system 229-1 and a volume from storage system 229-2, provisioned using their respective plug-ins 228-1 and 228-2.

By virtue of the foregoing, the policy engine 242 may identify and construct, in an automated manner, an optimal or near optimal composition of storage to meet a policy goal represented by in a virtual PV storage class 227 exposed at a container orchestrator 222. The policy engine 242 may leverage an ecosystem of storage plug-ins 228 and storage classes 226 without the intensive manual labor of writing code to support each plug-in 228. Moreover, the policy engine 242 may improve containerized application mobility, because as a containerized application moves to a new container environment, the policy engine 242 can automatically construct the correct persistent storage in the new container environment from storage available and discoverable in that new container environment.

The policy engine 242 may also include an operation router 253. The operation router 253 may be useful for handling storage operation requests 290 received via the API 244. For example, a user or administrator working in the container environment in which the container orchestrator 222 resides may seek to perform some operation on existing virtual PVs in the container environment (e.g., virtual PV 280 allocated to application 224). In some examples, the storage operation request 290 may be a standardized request compliant with a standard specification associated with the container storage interface 223. Example storage operation requests may include a snapshot operation, a backup operation, a restore operation, a create volume group request, or other storage operations.

A user or administrator (e.g., via a command line interface, graphical user interface, or the like), an application (e.g., 224), a script in the container environment, or other means of interfacing with the container orchestrator 222 may issue the storage operation request 290, e.g., via API 244, to a storage virtualization system (e.g., 130) or policy engine 242 thereof. Within the storage virtualization system and policy engine 242, the operation router 253 receives the storage operation request 290.

The storage operation request 290 includes at least one volume identifier. The volume identifier may be a virtual PV volume identifier associated with a virtual PV or may be a volume group identifier as described further herein below. In some cases, the storage operation request 290 includes a plurality of virtual PV volume identifiers associated with respective virtual PVs. To illustrate, with reference to FIG. 2, the storage operation request 290 may include the volume identifier 281 (i.e., VIRTUAL_PV(1)) of virtual PV 280, for example. A virtual PV identified by the storage operation request 290 is an existing virtual PV and may be composed of one or more underlying storage volumes (e.g., 272-1, 272-2) provisioned from storage systems (e.g., 229-1, 229-2) and blended in a hierarchical data structure (e.g., Merkle tree) that relates data objects by content-based signatures to a root object, as described previously.

The operation router 253 references the virtualization maps 264 to identify a volume mapping that corresponds to the volume identifier included in the storage operation request 290. For example, presuming the storage operation request 290 is intended to act on the virtual PV 280 by referencing the virtual PV identifier 281 of virtual PV 280, the operation router 253 may match that virtual PV identifier 281 to an entry in the virtualization maps 264 (e.g., VIRTUAL_PV(1)). The operation router 253 then looks up the volume mapping for VIRTUAL_PV(1) in the virtualization maps 264 and identifies the underlying volume identifiers (e.g., VOL(2), VOL(3)) corresponding to the underlying storage volumes (e.g., 272-1, 272-2) of the virtual PV 280. In some examples, the operation router 253 may recursively check the underlying volumes of an identified volume mapping to determine if those underlying volumes have further volume mappings (i.e., nested volume mappings), such as in an implementation that includes volume groups as described further herein below.

The operation router 253 then relays, via the container storage interface API 244 and the container storage interface 223, the storage operation request 290 to each storage system (e.g., 229-1, 229-2) hosting the underlying storage volumes (e.g., 272-1, 272-2) using the underlying volume identifiers (e.g., VOL(2), VOL(3)) as arguments of respective relayed storage operation requests. That is, for example, a storage operation request 292 with VOL(2) as an argument is issued to storage system 229-1 via storage A plug-in 228-1, and a storage operation request 294 with VOL(3) as an argument is issued to storage system 229-2 via storage B plug-in 228-2.

The operation router 253 may relay the multiple storage operation requests to backend storage systems 229 in parallel, in sequence, or a combination thereof where a plurality of underlying volumes exist. Except for different volume identifier arguments, the storage operation requests 292, 294 may be the same as (i.e., a copy of) the received storage operation request 290 in some cases and implementations, owing to standardization by container storage interface 223. In such cases, relaying the storage operation request 290 as storage operation requests 292, 294 may be understood to be issuing the same storage operation request with arguments specific to an underlying storage volume.

Moreover, if a storage operation request includes multiple volume identifiers, the storage operation request may be relayed to the underlying volumes for each of those volume identifiers in a similar manner. Because the operation router 253 may relay the storage operation request 290 to multiple storage systems 229 and is not limited to forwarding the storage operation request 290 to a single storage system 229, the operation router 253 may be understood to be a multi-cast router.

After processing the requests 292, 294, the storage systems 229-1, 229-2 may return success or failure messages to the operation router 253. In some implementations, if any failure message is received, the policy engine 242 may return a failure message to the container orchestrator 222. If no failure messages are received, the policy engine 242 may return a success message to the container orchestrator 222. In some implementations, the operation router 253 may have failure handling capabilities. The operation router 253 may maintain a transaction log for a storage operation request 290 to be performed on a virtual PV 280. The operation router 253 may track the nature of the storage operation requests (e.g., 292, 294) relayed to the backend storage systems (e.g., 229-1, 229-2) for execution against the underlying storage volumes, such as the type of operation relayed and its arguments. In some implementations, if a backend storage system reports a failure occurred in executing the relayed storage operation request, the operation router 253 may completely roll back the state of the virtual PV 280. For example, if the storage operation request 290 was a snapshot request (which will be described further below), the operation router 253 may roll back the state of the virtual PV 280 by issuing delete requests to any backend storage system that reported success in creating a snapshot of an underlying storage volume, thus deleting the incomplete snapshot.

By virtue of the foregoing, the operation router 253 may handle storage operation requests directed to virtual PVs composed of multiple underlying storage volumes in an efficient and automated manner that is transparent to and without intervention from users, the containerized application 224, and the container orchestrator 222.

Some non-limiting examples of storage operation requests will now be described. Although the examples are described with reference to elements of FIG. 2, it should be understood that the principles of the examples may be similarly extended to other computing environments and to other virtual PVs composed of more or fewer underlying storage volumes.

In an example, a snapshot type storage operation request 290 (also referred to herein as a snapshot request) may be received by the policy engine 242, via the API 244 for example, with the virtual PV identifier of virtual PV 280 (e.g., VIRTUAL_PV(1)) as an argument, in order to take a snapshot of virtual PV 280. The operation router 253 matches the request 290 to the volume mapping of VIRTUAL_PV(1):VOL(2),VOL(3) from the virtualization maps 264. The operation router 253 then relays the snapshot request to the backend storage systems: as a snapshot request 292 to storage system 229-1 with VOL(2) as an argument, and as a snapshot request 294 to storage system 229-2 with VOL(3) as an argument. The storage systems 229-1 and 229-2 may perform snapshots (e.g., copy-on-write or redirect-on-write snapshots) on volumes identified by VOL(2) and VOL(3), returning VOL(2).SNAP(1) and VOL(3).SNAP(1) respectively to the policy engine 242. The virtual PV manager 250 may then update the virtualization maps 264 data structure to include the volume mapping of the resulting snapshot of virtual PV 280 as VIRTUAL_PV (1).SNAP(1): VOL(2).SNAP(1),VOL(3).SNAP(1).

In another example, a backup type storage operation request 290 (also referred to herein as a backup request) may be received by the policy engine 242, via the API 244 for example, with the virtual PV identifier of virtual PV 280 (e.g., VIRTUAL_PV(1)) as an argument, in order to create a full backup of the virtual PV 280 (as opposed to an incremental backup or snapshot). The storage operation request 290 may also include a target (also referred to as a destination) for the backup. For example, the target may be another storage system in the container environment, may be in another container environment, may be a public cloud storage system, or any other storage system. In some implementations, a backup by the storage operation request 290 may be an additional and complementary backup mechanism to scheduled backups handled by the volume extent and replica manager 254. After identifying the volume mapping as described above, the operation router 253 relays the backup request to the backend storage systems: as a backup request 292 to storage system 229-1 with VOL(2) and the target as arguments, and as a backup request 294 to storage system 229-2 with VOL(3) and the target as arguments. The storage systems 229-1 and 229-2 may then perform a full backup (i.e., a full copy) for the volumes identified by VOL(2) and VOL(3) respectively to the target indicated in requests 292, 294. In some implementations, the storage systems 229-1 and 229-2 may return volume identifiers for the backups, such as VOL(2).BCKP(1) and VOL(3).BCKP(1), respectively, and the virtual PV manager 250 may then update the virtualization maps 264 data structure to include the volume mapping of the resulting backup of virtual PV 280 as VIRTUAL_PV(1).BCKP(1): VOL(2).BCKP(1),VOL(3).BCKP(1).

In another example, a restore type storage operation request 290 (also referred to herein as a restore request) may be received by the policy engine 242, via the API 244 for example, with the virtual PV identifier of virtual PV 280 (e.g., VIRTUAL_PV(1).SNAP(1)) as an argument, in order to restore a backup or snapshot of the virtual PV 280. As above, the operation router 253 may identify the volume identifiers for underlying storage volumes of the virtual PV indicated in the restore request 290. For example, VIRTUAL_PV(1).SNAP(1) would be identified as mapped to VOL(2).SNAP(1) and VOL(3).SNAP(1).

In some implementations, the container environment (i.e., the container storage interface in particular) may support restore-in-place, that is, the snapshot or backup data is restored onto the existing virtual PV 280. In restore-in-place implementations, the operation router 253 may relay a restore request 292 to storage system 229-1 with VOL(2).SNAP(1) as an argument, and a restore request 294 to storage system 229-2 with VOL(3).SNAP(1) as an argument. The storage systems 229-1 and 229-2 may then restore a backup or snapshot on to VOL(2) and VOL(3) respectively, thus effectively restoring a backup or snapshot of VIRTUAL_PV(1).

In some implementations, the container environment may not support restore-in-place. In such implementations, the operation router 253 may issue create volume requests using the underlying volume identifiers for each of the underlying storage volumes to their corresponding backend storage systems. For example, the operation router 253 may issue a create volume request 292 to storage system 229-1 with VOL(2).SNAP(1) as an argument, and a create volume request 294 to storage system 229-2 with VOL(3).SNAP(1) as an argument. The storage system 229-1 may then create new volume VOL(4) from VOL(2).SNAP(1), and storage system 229-2 may create new volume VOL(5) from VOL(3).SNAP(1). The virtual PV manager 250 may then aggregate (e.g., using the data path 232, as described above) the new volumes VOL(4), VOL(5) resulting from the create volume requests 292, 294 into a new virtual PV, identified as VIRTUAL_PV(2), and store a new volume mapping VIR- TUAL_PV(2):VOL(4),VOL(5) in the virtualization maps 264. VIRTUAL_PV(1) may continue to exist alongside VIRTUAL_PV(1). The policy engine 242 may return VIRTUAL_PV(2), to the container orchestrator 222 for example, in response to the restore request 290.

As another example storage operation, the operation router 253 may receive a delete type storage operation request 290 (also referred to herein as a delete request), via the API 244 for example, with a virtual PV identifier of a virtual PV to delete (e.g., VIRTUAL_PV(1) for virtual PV 280). In response, the operation router 253 may identify the volume mapping from the virtualization maps 264 as described above and issue delete storage requests (e.g., 292, 294) to the backend storage systems (e.g., 229-1, 229-2) using the underlying volume identifiers from the identified volume mapping (e.g., VOL(2), VOL(3)). If those delete storage requests are successful, the virtual PV manager 250 may delete the virtual PV identifier (e.g., VIRTUAL_PV(1)) from the virtualization maps 264 data structure.

In some implementations, the virtual PV manager 250 may include a capability to create volume groups. For example, the policy engine 242 may receive, via the API 244 for example, a create volume group type storage operation request 290 (also referred to herein as a create volume group request) that includes the volume identifiers of virtual PVs to group together, such as, for the sake of illustration, VIRTUAL_PV(1) and VIRTUAL_PV(2) (which may be different than the VIRTUAL_PV(1) and VIRTUAL_PV(2) described above in other examples). In response to the create volume group request 290, the virtual PV manager 250 may create a new volume mapping in the virtualization maps 264 data structure that maps a new volume group identifier to the plurality of virtual PV identifiers: e.g., VOL_GROUP(A): VIRTUAL_PV(1),VIRTUAL_PV(2). The new volume group identifier VOL_GROUP(A) may be returned to container orchestrator 222.

A volume group identifier may function similarly to a virtual persistent volume identifier in many respects, particularly with respect to storage operation requests, and both may thus be referred to generally as a volume identifier in some implementations. Thus, various aspects of handling a virtual persistent volume identifier described herein may be applied similarly to a volume group identifier.

For example, a storage operation request 290 with the group identifier VOL_GROUP(A) as an argument may be received by the policy engine 242, via the API 244 for example. In response, the operation router 253 may identify the VOL_GROUP(A) volume mapping from the virtualization maps 264 and recursively check the volume mapped to VOL_GROUP(A) until the underlying volumes of backend storage systems have been identified. For example, the operation router 253 may determine that the VOL_GROUP(A) includes virtual volumes VIRTUAL_PV(1) and VIRTUAL_PV(2). By further checking the virtualization maps 264, the operation router 253 may determine that the VIRTUAL_PV(1) and VIRTUAL_PV(2) each include underlying volumes (e.g., VIRTUAL_PV(1) includes VOL(2) and VOL(3)). Thus, it may be understood that one or more levels of volume mappings are nested within the group identifier type of identifier passed with the request 290. Once the operation router 253 has identified the underlying volume identifiers, the operation router 253 may relay the storage operation request 290 to the backend storage systems for those underlying volumes. In this manner, volume groups may be used for efficient and consistent storage management across multiple virtual PVs and may also be used for policy-based storage management.

FIGS. 3-6 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 3-6 may be implemented in the form of executable instructions stored on a machine readable medium and executed by a processing resource and/or in the form of electronic circuitry. For example, aspects of the methods may be described below as being performed by a storage virtualization system, an example of which may be the containerized storage virtualization system 130 running on a hardware processor resource 102 of the computing system 100 described above. Aspects of the methods may be further attributed to a policy engine of such a storage virtualization system, such as the policy engine 242 described above. Additionally, other aspects of the methods described below may be described with reference to other elements shown in FIG. 2 for non-limiting illustration purposes.

Figure 3:
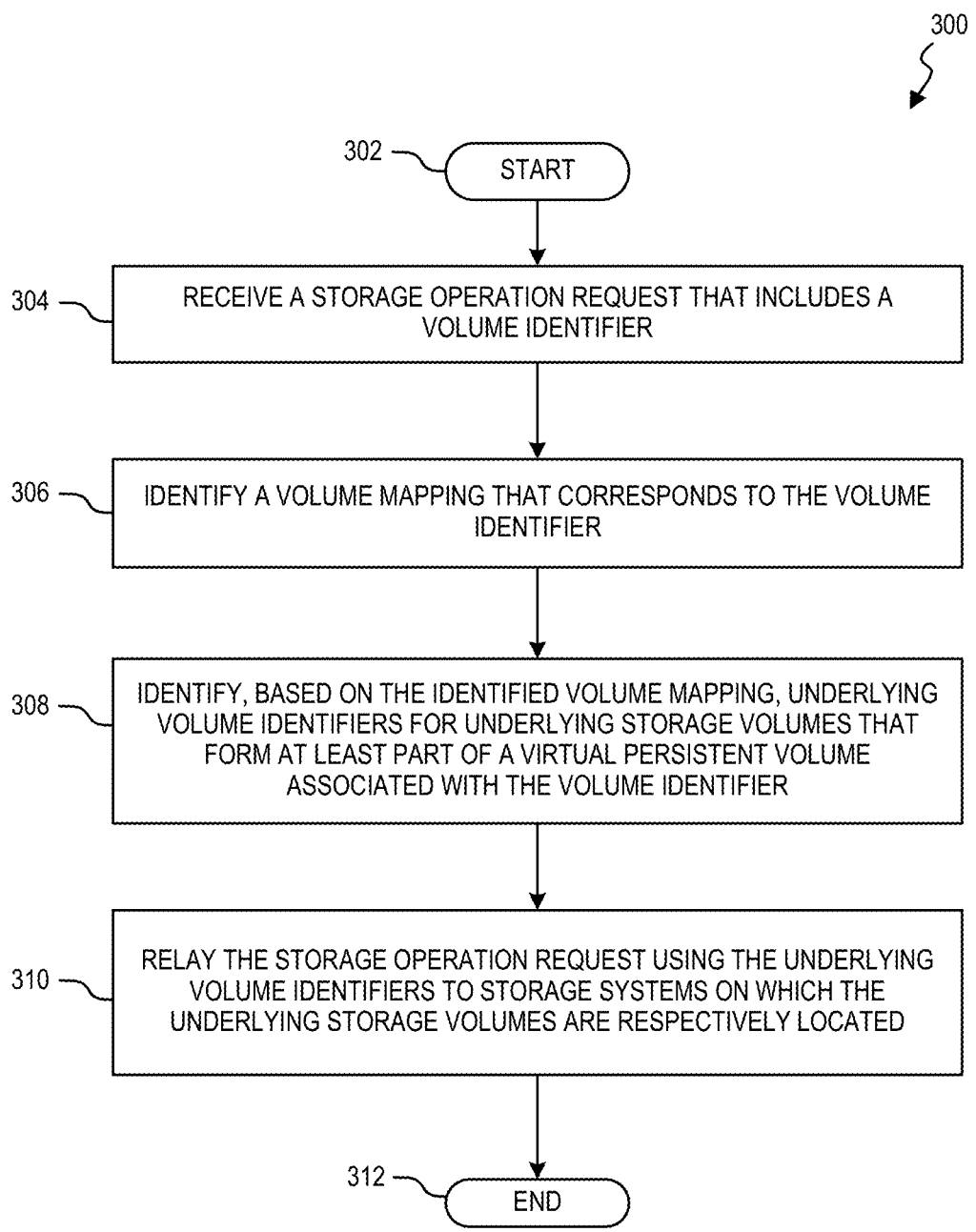
FIG. 3 depicts an example method that includes relaying a storage operation request to a storage system corresponding to an underlying storage volume of a virtual persistent volume.

FIG. 3 is a flow diagram depicting an example method 300. Method 300 starts at block 302 and continues to block 304, where a storage virtualization system receives a storage operation request 290 that includes a volume identifier. The volume identifier may be of various types, such as a virtual persistent volume identifier (e.g., the virtual PV identifier 281, VIRTUAL_PV(1), associated with virtual PV 280) or a volume group identifier that represents a group of virtual PVs. The storage operation request 290 may be received from a container orchestrator 222 via a container storage interface 223 and API 244 thereof.

At block 306, the storage virtualization system identifies a volume mapping that corresponds to the volume identifier received with the storage operation request at block 304. For example, the storage virtualization system may reference a virtualization maps 264 data structure for volume mappings.

At block 308, the storage virtualization system identifies, based on the volume mapping identified at block 306, underlying volume identifiers for underlying storage volumes that form at least part of a virtual PV associated with the volume identifier included in the received storage operation request. For example, in the illustration of FIG. 2, the storage virtualization system identifies underlying volume identifiers VOL(2) and VOL(3) are mapped to VIRTUAL_PV(1), the volume identifier of the storage operation request 290. The underlying volumes identified by VOL(2) and VOL(3) form at least part of virtual PV 280, which is associated with VIRTUAL_PV(1).

At block 310, the storage virtualization system relays the storage operation request 290, using the underlying volume identifiers identified at block 308, to backend storage systems 229-1, 229-2 on which the underlying storage volumes are respectively located. The method 300 ends at block 312. In this manner, storage operation requests on a virtual PV made up of multiple underlying volumes may be handled seamlessly and transparently to the requester. Various types of storage operation requests may be handled in this manner, including snapshot requests, backup requests (e.g., full backup), restore requests, delete requests, or other requests.

Figure 4:
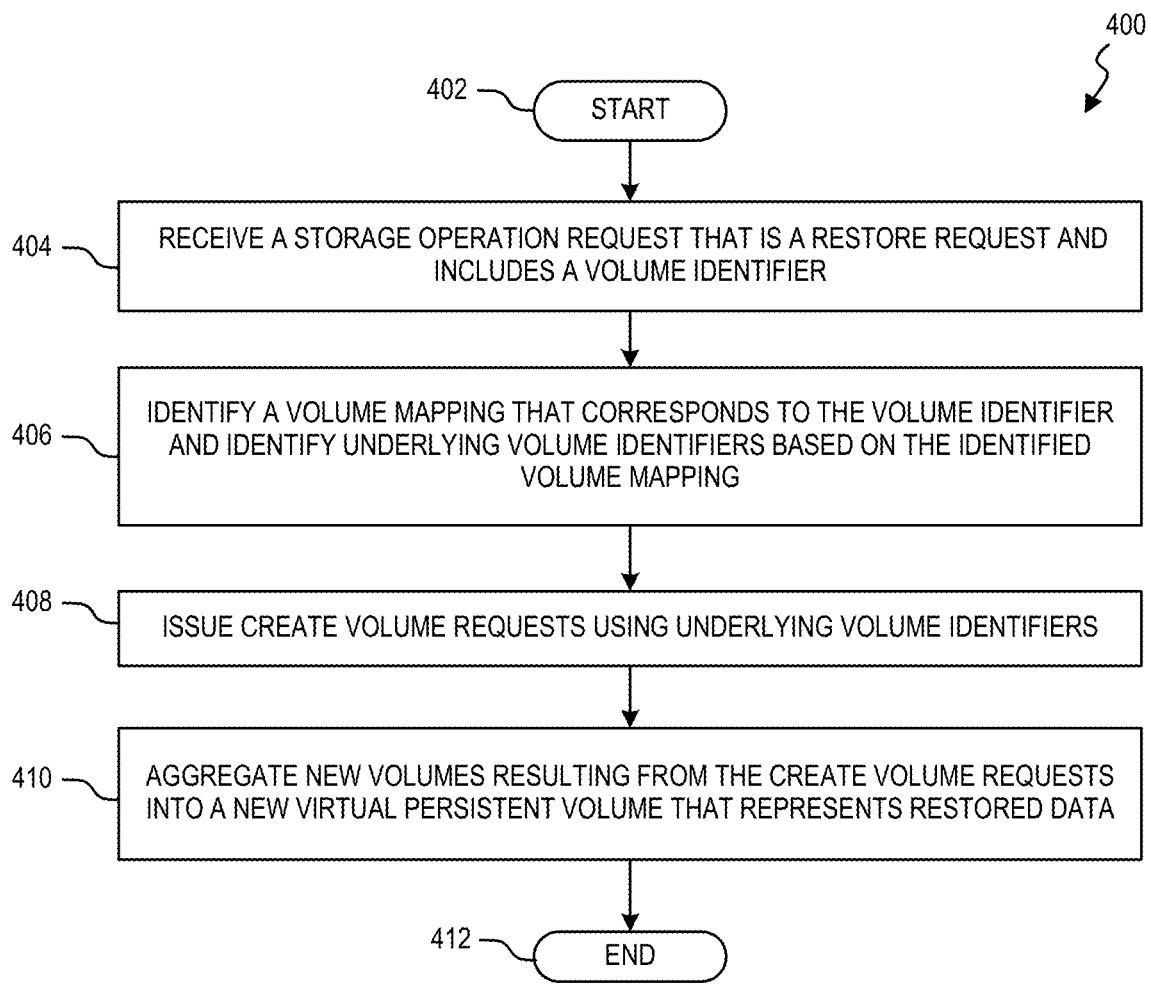
FIG. 4 depicts an example method that includes creating a new virtual persistent volume that represents restored data.

FIG. 4 is a flow diagram depicting an example method 400, which may be useful for handling restore type storage operation requests in environments where restore-in-place is not supported. Method 400 starts at block 402 and continues to block 404. At block 404, the storage virtualization system receives a storage operation request that is a restore request. The restore request includes a volume identifier of the volume to restore (e.g., VIRTUAL_PV(1).SNAP(1)).

At block 406, the storage virtualization system identifies a volume mapping that corresponds to the volume identifier received at block 404 and identifies the underlying volume identifiers based on that volume mapping (e.g., VOL(2).SNAP(1) and VOL(3).SNAP(1)). Block 406 may be analogous in many respects to blocks 306, 308 described above.

At block 408, the storage virtualization system issues create volume requests using each of the underlying volume identifiers identified at block 406 to corresponding storage systems 229. Issuing the create volume requests may be understood to serve as relaying the storage operation request to backend storage as in block 310 described above. The backend storage systems 229 then create new volumes from the underlying volumes identified by the underlying volume identifiers passed as arguments with the create volume requests (e.g., by cloning). The backend storage systems 229 may return new volume identifiers for the newly created volumes to the storage virtualization system (e.g., VOL(4) created from VOL(2).SNAP(1) and VOL(5) created from VOL(3).SNAP(1)).

At block 410, the storage virtualization system aggregates, via a data path for example, new volumes resulting from issuing the create volume requests at block 408 into a new virtual persistent volume that represents restored data. The storage virtualization system may add that a new volume mapping for the newly aggregated virtual PV to the virtualization maps 264 (e.g., VIRTUAL_PV(2):VOL(4), VOL(5)). The method 400 ends at block 412.

Figure 5:
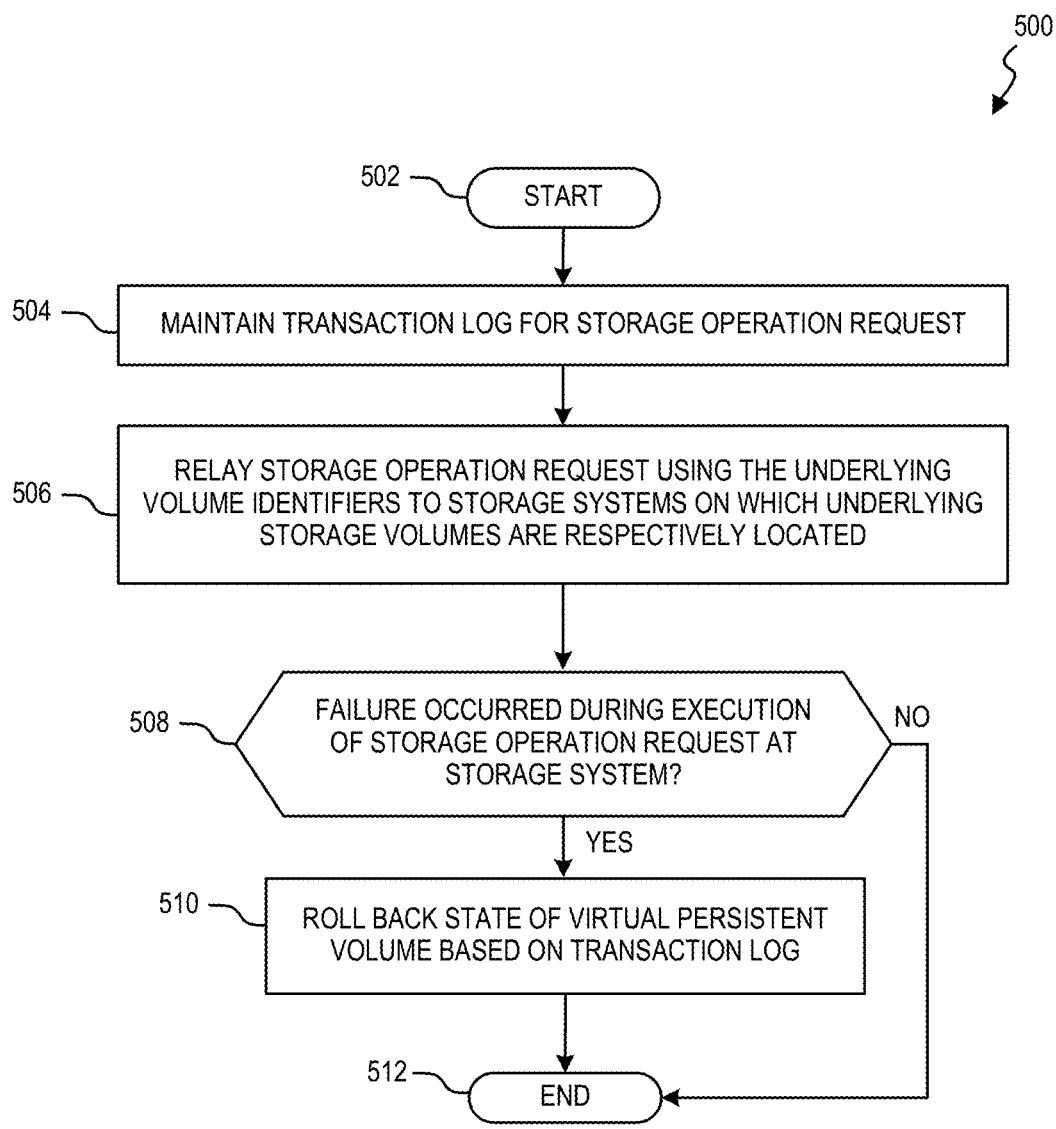
FIG. 5 depicts an example method that includes rolling back a state of a virtual persistent volume based on a transaction log.

FIG. 5 is a flow diagram depicting an example method 500. In some implementations, method 500 may be performed after block 304 of method 300, and may be useful for error handling during execution of method 300. Method 500 starts at block 502 and continues to block 504. At block 504, the storage virtualization system maintains a transaction log for a storage operation request 290. As with methods described above, the storage operation request 290 includes a volume identifier that is associated with a virtual PV or group of virtual PVs on which the storage operation is to be performed. Underlying volume identifiers may be identified from the volume identifier via a volume mapping, as described above.

Block 506 may be analogous in many respects to block 310 described above. At block 506, the storage virtualization system may relay the storage operation request using underlying volume identifiers (e.g., identified in a similar manner to blocks 306, 308) to backend storage systems 229. Each of the backend storage systems processes the relayed storage operation requests 292, 294 independently. The backend storage systems 229 return either a success or failure message to the storage virtualization system. The transaction log maintains one or more of: the relayed storage operation requests 292, 294; success or failure messages returned by the backend storage systems 229; volume identifiers returned by the backend storage systems (e.g., if the relayed storage operation was successful, in a restore or snapshot operation for example); or other information resulting from the storage operation requests relayed to backend storage.

At block 508, the storage virtualization system determines whether a failure occurred during execution of a relayed storage operation request. For example, the storage virtualization system checks whether a backend storage system 229 returned a failure message. If no failures have been returned ("NO" at block 508), then the method 500 may proceed to end at block 512.

If a failure did occur ("YES" at block 508), then in response, the storage virtualization system rolls back a state of the virtual PV based on the transaction log. For example, rolling back may include reverting to a state of the underlying storage volumes of the virtual PV prior to executing the relayed storage operation requests. Rolling back may involve issuing storage operation requests to the backend storage that reverse any successful storage operation requests relayed by block 506. To illustrate, if a relayed storage operation request created a snapshot, the snapshot volume identifier is stored in the transaction log, and rolling back the state of the virtual PV includes issuing a delete request against the snapshot volume identifier. After rolling back the virtual PV, the method 500 ends at block 512.

In some implementations, the storage virtualization system may return a success (if "NO" at block 508) or a failure (if "YES" at block 508) to the requesting entity issuing the storage operation request 290 in the first instance. In this manner, the storage operation request 290 may be deemed completed only if all relayed storage operation requests 292, 294 have been successfully completed, so as to prevent partially complete operations that leave a virtual PV in an inconsistent state. Such error handling by method 300 may be useful for making storage operations on composite virtual PVs transparent to users and applications.

Figure 6:
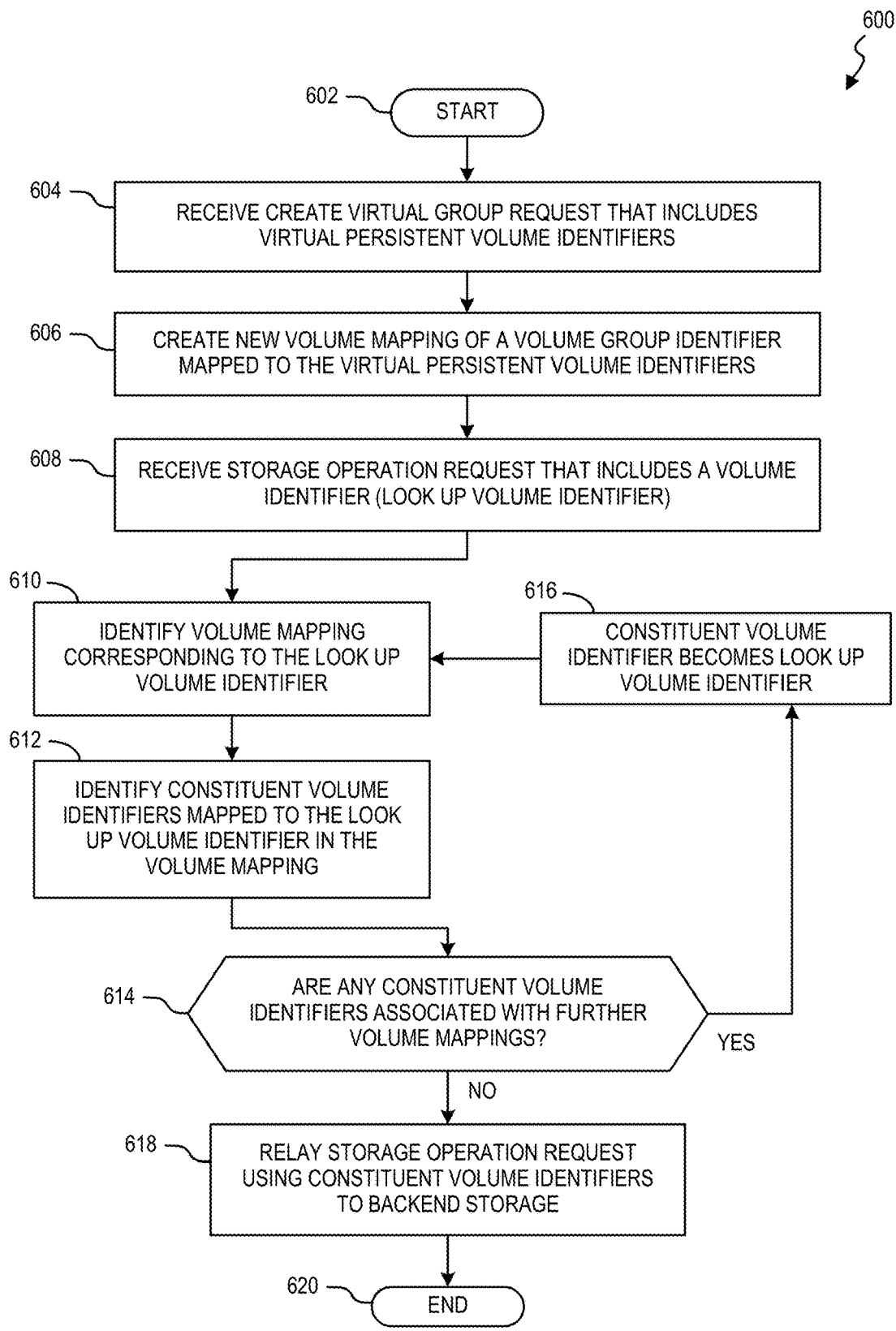
FIG. 6 depicts an example method that includes identifying further volume mappings.

FIG. 6 is a flow diagram depicting an example method 600. In some implementations, method 600 may be useful for performing a storage operation request consistently across a group of virtual PVs. Method 600 begins at block 602 and continues to block 604, where the storage virtualization system receives a create volume group request that includes a plurality of virtual PV identifiers.

In response to that create volume group request, at block 606, the storage virtualization system creates a new volume mapping that includes a volume group identifier mapped to the plurality of virtual PV identifiers (e.g., VOL_GROUP (A):VIRTUAL_PV(1),VIRTUAL_PV(2)). That new volume mapping may be stored in a virtualization maps 264 data structure.

At a later time, the storage virtualization system may receive, at block 608, a storage operation request 290 that includes a volume identifier, also referred to as a look up volume identifier for the purposes of FIG. 6. The volume identifier received with the storage operation request 290 may be a volume group identifier (e.g., VOL_GROUP(A)).

At block 610, the storage virtualization system identifies a volume mapping corresponding to the look up volume identifier. At block 612, the storage virtualization system identifies constituent volume identifiers (e.g., VIRTUAL_PV(1), VIRTUAL_PV(2)) mapped to the look up volume identifier (e.g., VOL_GROUP(A)).

At block 614, the storage virtualization system determines if any constituent volume identifier identified at block 612 are associated with further volume mapping (i.e., a nested volume mapping). In particular, the storage virtualization system may determine if a constituent volume identifier exists in the virtualization maps 264. If not ("NO" at block 614), then the method 600 proceeds to block 618, where the storage virtualization system relays the storage operation request to the identified constituent volume identifiers in a manner similar to block 310 described previously.

If a constituent volume identifier is or is associated with a further volume mapping ("YES" at block 614, as would be the case for VIRTUAL_PV(1) and VIRTUAL_PV(2) which are constituent volume identifiers of VOL_GROUP(A) for example), the method 600 continues to block 616, where the constituent volume identifier (e.g., VIRTUAL_PV(1) and VIRTUAL_PV(2)) becomes the next look up volume identifier. The method 600 then proceeds to identify constituent volume identifiers for the next look up volume identifier (e.g., VOL(2), VOL(3) for VIRTUAL_PV(1) and VOL(4), VOL(5) for VIRTUAL_PV(2)).

Blocks 610, 612, 614, 616 as a whole recursively checks if a volume mapping includes a further volume mapping to another volume identifier and identifies another volume mapping for the another volume identifier until the underlying volume identifiers for each of the underlying storage volumes is determined. Blocks 610, 612, 614, 616 may be implemented as part of blocks 306 and/or 308 described above.

Figure 7:
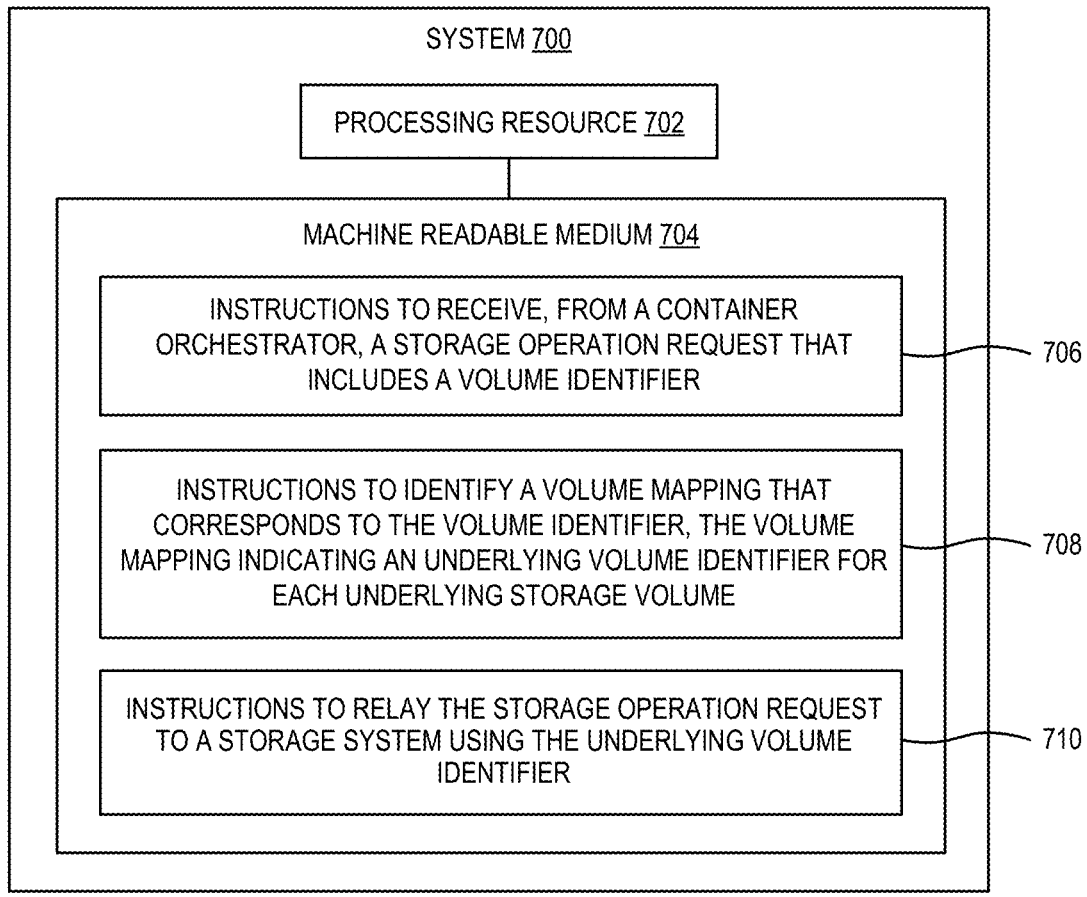
FIG. 7 depicts an example system with a machine readable medium that includes instructions to relay a storage operation request to a storage system corresponding to an underlying storage volume of a virtual persistent volume.
Figure 8:
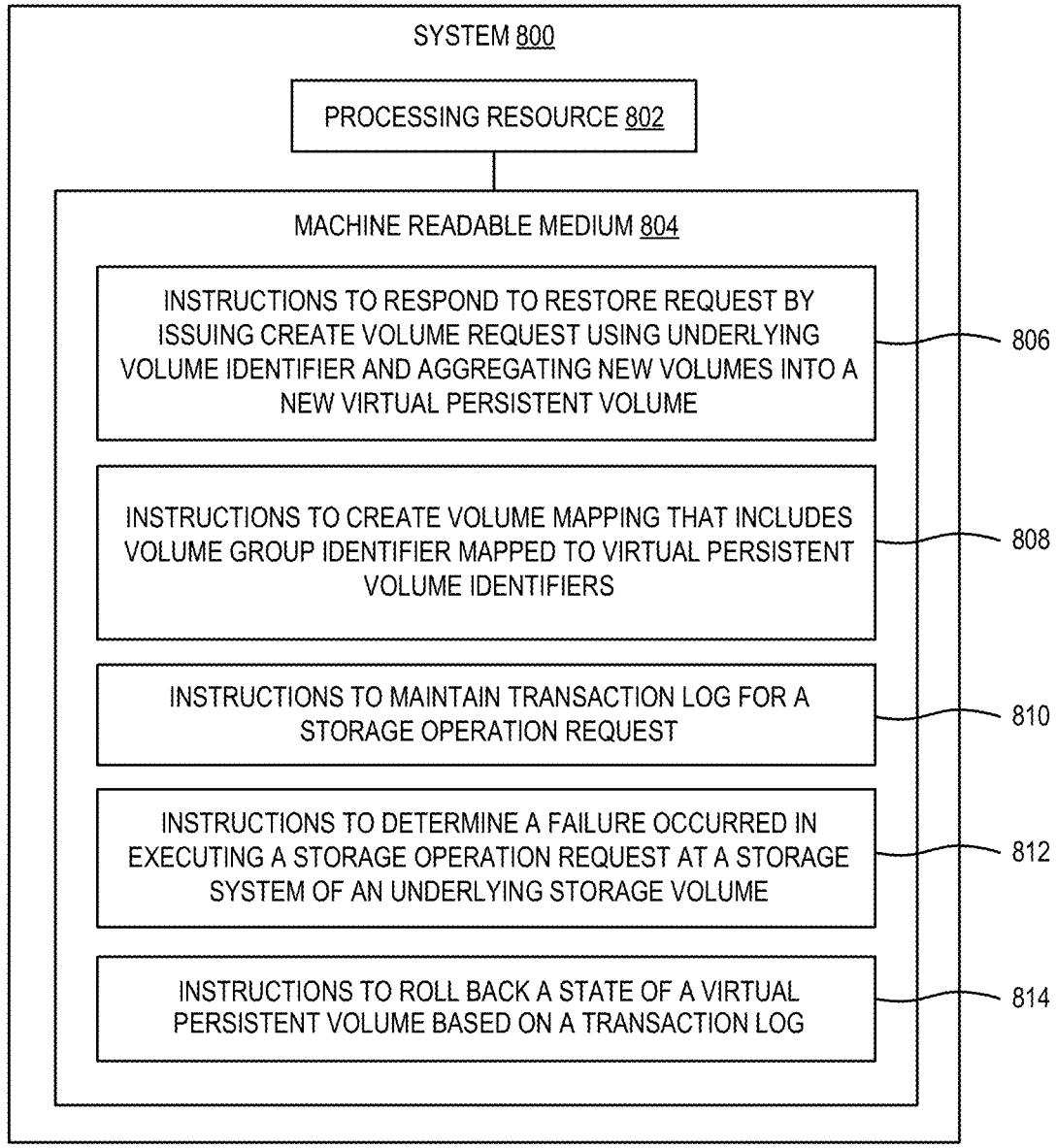
FIG. 8 depicts an example system with a machine readable medium that includes instructions to respond to a restore request and instructions to roll back a state of a virtual persistent volume based on a transaction log.

FIGS. 7 and 8 depict example systems 700, 800, respectively, that include non-transitory, machine readable media 704, 804, respectively, encoded with example instructions executable by processing resources 702, 804, respectively. In some implementations, the systems 700, 800 may be useful for implementing aspects of the storage virtualization system 130 of FIG. 1 or the policy engine 242 of FIG. 2 or for performing aspects of methods 300, 400, 500, and/or 600 of FIGS. 3-6, respectively. For example, the instructions encoded on machine readable media 704 and/or 804 may be included in instructions 105 of FIG. 1. In some implementations, functionality described with respect to FIG. 2 may be included in the instructions encoded on machine readable media 704 and/or 804.

The processing resources 702, 802 may include a microcontroller, a microprocessor, central processing unit core(s), an ASIC, an FPGA, and/or other hardware device suitable for retrieval and/or execution of instructions from the machine readable media 704, 804 to perform functions related to various examples. Additionally or alternatively, the processing resources 702, 802 may include or be coupled to electronic circuitry or dedicated logic for performing some or all of the functionality of the instructions described herein.

The machine readable media 704, 804 may be any medium suitable for storing executable instructions, such as RAM, ROM, EEPROM, flash memory, a hard disk drive, an optical disc, or the like. In some example implementations, the machine readable media 704, 804 may be a tangible, non-transitory medium. The machine readable media 704, 804 may be disposed within the systems 700, 800 respectively, in which case the executable instructions may be deemed installed or embedded on the system. Alternatively, the machine readable media 704, 804 may be a portable (e.g., external) storage medium, and may be part of an installation package.

As described further herein below, the machine readable media 704, 804 may be encoded with a set of executable instructions. It should be understood that part or all of the executable instructions and/or electronic circuits included within one box may, in alternate implementations, be included in a different box shown in the figures or in a different box not shown. Some implementations may include more or fewer instructions than are shown in FIGS. 7 and 8.

With reference to FIG. 7, the machine readable medium 704 includes instructions 706, 708, 710. Instructions 706, when executed, cause the processing resource 702 to receive, from a container orchestrator, a storage operation request that includes a volume identifier. The storage operation request may be a backup request, a snapshot request, a restore request, a delete request, or other type of request. The volume identifier may be a virtual PV identifier associated with a virtual PV composed of at least one underlying storage volume provisioned from storage systems. The volume identifier may be a volume group identifier composed of multiple virtual PVs.

Instructions 708, when executed, cause the processing resource 702 to identify a volume mapping that corresponds to the volume identifier. Instructions 708 may also cause the processing resource 702 to identify underlying volume identifiers for the one or more underlying storage volumes that form at least part of a virtual PV associated with the volume identifier included in the received storage operation request. In some implementations, instructions 708 may operate recursively on the volume identifier (e.g., in the manner described with respect to FIG. 6), particularly if a volume mapping is linked to further volume mappings, as may be the case if the volume identifier received with the storage operation request was a volume group identifier.

Instructions 710, when executed, cause the processing resource 702 to relay the storage operation request to each storage system corresponding to an underlying storage volume using an underlying volume identifier identified by instructions 708.

Referring now to FIG. 8, machine readable medium 804 includes instructions 806, 808, 810, 812, 814. Instructions 806, when executed, cause the processing resource 802 to respond to a storage operation request that is a restore request by issuing create volume requests using underlying volume identifiers for each underlying storage volume to corresponding backend storage systems. Instructions 806 then cause the processing resource 802 to aggregate new volumes resulting from the create volume requests into a new virtual persistent volume that represents restored data. Instructions 806 may be performed as part of instructions 710 for relaying a restore type storage operation request, particularly in an environment that does not support restore-in-place, for example.

Instructions 808, when executed, cause the processing resource 802 to respond to a create volume group request by creating a new volume mapping that includes a volume group identifier mapped to a plurality of virtual PV identifiers.

Instructions 810, 812, 814 may be useful for error handling. Instructions 810, when executed, cause the processing resource 802 to maintain a transaction log for a storage operation request. Instructions 812, when executed, cause the processing resource 802 to determine that a failure occurred in executing a relayed storage operation request at a given storage type system hosting an underlying storage volume. Instructions 814, when executed, cause the processing resource 802 to respond to such a failure by rolling back a state of the virtual PV based on the transaction log.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A non-transitory machine readable medium storing instructions for a policy engine of a storage virtualization system that, when executed, cause a processing resource to:

receive, from a container orchestrator, a storage operation request that includes a volume identifier, the volume identifier being a virtual persistent volume identifier associated with a virtual persistent volume composed of at least one underlying storage volume provisioned from storage systems, wherein the virtual persistent volume is composed of the at least one underlying storage volume blended in a hierarchical data structure that relates data objects by content-based signatures to a root object;

identify a volume mapping that corresponds to the volume identifier, wherein the volume mapping indicates an underlying volume identifier for each of the at least one underlying storage volume; and relay the storage operation request to each storage system corresponding to the at least one underlying storage volume using the underlying volume identifier.

2. The non-transitory machine readable medium of claim 1, wherein the storage operation request is a snapshot request.

3. The non-transitory machine readable medium of claim 1, wherein the storage operation request is a restore request, and the instructions, when executed, cause the processing resource to, in response to the storage operation request being a restore request:

issue a create volume request using the underlying volume identifier for each of the at least one underlying storage volume to each corresponding storage type system, as part of relaying the storage operation request, and aggregate new volumes resulting from the create volume request into a new virtual persistent volume that represents restored data.

4. The non-transitory machine readable medium of claim 1, wherein the instructions, when executed, cause the processing resource to respond to a create volume group request by creating a new volume mapping that includes a volume group identifier mapped to a plurality of virtual persistent volume identifiers, wherein to identify the volume mapping, the instructions cause the processing resource to recursively check if the volume mapping includes a further volume mapping to virtual persistent volume identifiers until the underlying volume identifier for each of the at least one underlying storage volume is determined.

5. The non-transitory machine readable medium of claim 1, wherein the storage operation request is a full backup request.

6. The non-transitory machine readable medium of claim 1, wherein the instructions, when executed, cause the processing resource to maintain a transaction log for the storage operation request;

determine that a failure occurred in executing the storage operation request at a given storage system of the at least one underlying storage volume; and in response to determination of the failure, roll back a state of the virtual persistent volume based on the transaction log.

7. A method comprising:

receiving, by a hardware processor-based storage virtualization system in a container environment, a storage operation request from a container orchestrator that includes a volume identifier, wherein a type of the volume identifier is a virtual persistent volume identifier;

identifying, by the storage virtualization system, a volume mapping that corresponds to the volume identifier;

identifying, by the storage virtualization system and based on the identified volume mapping, underlying volume identifiers for underlying storage volumes that form at least part of a virtual persistent volume associated with the volume identifier included in the received storage operation request, wherein the virtual persistent volume is composed of the underlying storage volumes blended in a hierarchical data structure that relates data objects by content-based signatures to a root object; and relaying, by the storage virtualization system, the storage operation request using the underlying volume identifiers to storage systems on which the underlying storage volumes are respectively located, wherein the relaying the storage operation request is performed via a container storage interface application programming interface.

8. The method of claim 7, wherein the storage operation request is a snapshot request.

9. The method of claim 7, wherein the storage operation request is a full backup request.

10. The method of claim 7, further comprising responding to the storage operation request being a restore request by:

issuing a create volume request using each of the underlying volume identifiers to corresponding ones of the storage systems, as part of the relaying the storage operation request, and aggregate new volumes resulting from issuing the create volume request for each of the underlying volume identifiers into a new virtual persistent volume that represents restored data.

11. The method of claim 7, further comprising:

responding to a create volume group request by creating a new volume mapping that includes a volume group identifier mapped to a plurality of virtual persistent volume identifiers, wherein identifying the underlying volume identifiers includes recursively checking if the identified volume mapping includes a further volume mapping to another volume identifier and identifying another volume mapping for the another volume identifier until the underlying volume identifiers for each of the underlying storage volumes is determined.

12. The method of claim 7, further comprising:

maintaining a transaction log for the storage operation request;

determining that a failure occurred during execution of the storage operation request relayed to a storage system of an underlying storage volume of the underlying storage volumes; and in response to determination of the failure, rolling back a state of the virtual persistent volume based on the transaction log.

13. A system comprising:

a hardware processing resource; and a non-transitory machine readable medium storing instructions that, when executed, cause the hardware processing resource to:

receive a storage operation request from a container orchestrator that includes a volume identifier, wherein a type of the volume identifier is a virtual persistent volume identifier, identify a volume mapping that corresponds to the volume identifier, identify, based on the identified volume mapping, underlying volume identifiers for underlying storage volumes that form at least part of a virtual persistent volume associated with the volume identifier included in the received storage operation request, wherein the virtual persistent volume is composed of the underlying storage volumes blended in a hierarchical data structure that relates data objects by content-based signatures to a root object, and relay the storage operation request using the underlying volume identifiers to storage systems on which the underlying storage volumes are respectively located, wherein the storage operation request is relayed to storage systems via a container storage interface application programming interface.

14. The system of claim 13, wherein the storage operation request is a snapshot request or a full backup request.

15. The system of claim 13, wherein the storage operation request is a restore request, and the instructions, when executed, cause the hardware processing resource to respond to the restore request by:
issuing a create volume request using each of the underlying volume identifiers to corresponding ones of the storage systems, as part of relaying the storage operation request, and aggregate new volumes resulting from issuing the create volume request for each of the underlying volume identifiers into a new virtual persistent volume that represents restored data.

16. The system of claim 13, wherein the instructions, when executed, cause the hardware processing resource to respond to a create volume group request by creating a new volume mapping that includes a volume group identifier mapped to a plurality of virtual persistent volume identifiers, wherein the instructions that cause the hardware processing resource to identify the underlying volume identifiers includes instructions to recursively check if the identified volume mapping includes a further volume mapping to another volume identifier and identifying another volume mapping for the another volume identifier until the underlying volume identifiers for each of the underlying storage volumes is determined.

17. The system of claim 13, wherein the instructions, when executed, cause the hardware processing resource to:
maintain a transaction log for the storage operation request;

determine that a failure occurred in executing the storage operation request relayed to a storage system of an underlying storage volume of the underlying storage volumes; and in response to determination of the failure, roll back a state of the virtual persistent volume based on the transaction log.

\* \* \* \* \*